US011543865B2

(12) United States Patent
Ahn et al.

(10) Patent No.: US 11,543,865 B2
(45) Date of Patent: Jan. 3, 2023

(54) SOUND GENERATOR INCLUDING AN ULTRASOUND UNIT, DISPLAY DEVICE INCLUDING THE SOUND GENERATOR, AND METHOD OF DRIVING DISPLAY DEVICE

(71) Applicant: Samsung Display Co. Ltd., Yongin-si (KR)

(72) Inventors: Yi Joon Ahn, Seoul (KR); Jung Hun Noh, Yongin-si (KR)

(73) Assignee: Samsung Display Co. Ltd., Yongin-si (KR)

( * ) Notice: Subject to any disclaimer, the term of this patent is extended or adjusted under 35 U.S.C. 154(b) by 0 days.

(21) Appl. No.: 17/391,009

(22) Filed: Aug. 1, 2021

(65) Prior Publication Data

US 2021/0357002 A1 Nov. 18, 2021

Related U.S. Application Data

(63) Continuation of application No. 16/419,001, filed on May 22, 2019, now Pat. No. 11,079,811.

(30) Foreign Application Priority Data

Aug. 14, 2018 (KR) .................. 10-2018-0095179

(51) Int. Cl.
*G06F 3/01* (2006.01)
*G06F 1/16* (2006.01)
(Continued)

(52) U.S. Cl.
CPC .......... *G06F 1/1688* (2013.01); *G06F 1/1605* (2013.01); *G06F 1/1626* (2013.01);
(Continued)

(58) Field of Classification Search
CPC .... G06F 1/1605; G06F 1/1626; G06F 1/1643; G06F 1/1688; G06F 3/0412; H04R 1/025; H04R 1/083
See application file for complete search history.

(56) References Cited

U.S. PATENT DOCUMENTS 6,483,228 B2 * 11/2002 Hashimoto ........... B06B 1/0629
310/336
2008/0130921 A1 6/2008 Tokuhisa et al.
(Continued)

FOREIGN PATENT DOCUMENTS

EP 2637418 9/2013
WO 2017191957 11/2017

OTHER PUBLICATIONS

Extended European Search Report dated Dec. 10, 2019, issued in European Patent Application No. 19189511.9.
(Continued)

*Primary Examiner* — Sanghyuck Park
(74) *Attorney, Agent, or Firm* — H.C. Park & Associates, PLC

(57) ABSTRACT

A sound generator for a display device, including: a first vibration generation unit having a first electrode and a second electrode; a second vibration generation unit having a third electrode and a fourth electrode; and a vibration layer including: a first sub-vibration layer disposed between the first electrode and the second electrode; and a second sub-vibration layer disposed between the third electrode and the fourth electrode, wherein the first vibration generation unit is configured to contract and expand the first sub-vibration layer based on a first driving voltage applied to the first electrode and a second driving voltage applied to the second electrode, and wherein the second vibration generation unit is configured to contract and expand the second
(Continued)

sub-vibration layer based on a third driving voltage applied to the third electrode and a fourth driving voltage applied to the fourth electrode.

20 Claims, 29 Drawing Sheets

(51) Int. Cl.
    *G06F 3/041*     (2006.01)
    *H04R 1/02*     (2006.01)
    *H04R 1/08*     (2006.01)

(52) U.S. Cl.
    CPC .......... *G06F 1/1643* (2013.01); *G06F 3/0412* (2013.01); *H04R 1/025* (2013.01); *H04R 1/083* (2013.01)

(56) References Cited

U.S. PATENT DOCUMENTS

| | | | |
|---|---|---|---|
| 2012/0280944 A1 | 11/2012 | St. Pierre et al. | |
| 2013/0243224 A1 | 9/2013 | Onishi et al. | |
| 2015/0117682 A1 | 4/2015 | Fukami et al. | |
| 2015/0117684 A1* | 4/2015 | Fukami | B06B 1/10 |
| | | | 381/190 |
| 2016/0014525 A1 | 1/2016 | Park et al. | |
| 2017/0288638 A1* | 10/2017 | Wildes | H01L 41/113 |
| 2018/0182359 A1 | 6/2018 | Liu et al. | |
| 2019/0001440 A1 | 1/2019 | Zrodowski et al. | |
| 2019/0005002 A1 | 1/2019 | Tsuji et al. | |
| 2019/0095015 A1 | 3/2019 | Han et al. | |
| 2019/0107902 A1 | 4/2019 | Kao | |

OTHER PUBLICATIONS

Non-Final Office Action dated Nov. 27, 2020, in U.S. Appl. No. 16/419,001.

Notice of Allowance dated Apr. 1, 2021, in U.S. Appl. No. 16/419,001.

Notice of Allowance dated May 12, 2021, in U.S. Appl. No. 16/419,001.

* cited by examiner

SOUND GENERATOR INCLUDING AN ULTRASOUND UNIT, DISPLAY DEVICE INCLUDING THE SOUND GENERATOR, AND METHOD OF DRIVING DISPLAY DEVICE

CROSS REFERENCE TO RELATED APPLICATION

This application is a Continuation of U.S. patent application Ser. No. 16/419,001, filed May 22, 2019, which issued as U.S. Pat. No. 11,079,811, which claims priority from and the benefit of Korean Patent Application No. 10-2018-0095179, filed on Aug. 14, 2018, each of which is hereby incorporated by reference for all purposes as if fully set forth herein.

BACKGROUND

Field

Exemplary implementations of the invention relate generally to a sound generator, a display device including the same, and a method of driving the display device, and, more particularly to a sound generator including an ultrasound unit that acts a proximity sensor for a display device and a method of driving the display to generate sound or ultrasonic waves.

Discussion of the Background

With the development of an information dependent society, requirements for display devices for displaying images have increased in various forms. For example, display devices are applied to various electronic appliances such as smart phones, digital cameras, notebook computers, navigators, and smart televisions. A display device may include a display panel for displaying an image and a sound generator for providing a sound.

As display devices are applied to various electronic appliances, display devices having various designs are required. For example, in the case of a smart phone, a display device may have an increased display area by omitting a sound generator and a proximity sensor disposed on the front side of the display device used to output a voice of a counterpart of a phone call in the call mode.

The above information disclosed in this Background section is only for understanding of the background of the inventive concepts, and, therefore, it may contain information that does not constitute prior art.

SUMMARY

Display devices constructed according to exemplary implementations of the invention, and methods of driving such displays are capable of generating a sound or an audible signal and an ultrasonic wave which can be utilized as an ultrasonic proximity sensor. For example, the display device may include a sound generator not exposed to the outside that may generate a sound and an ultrasonic wave that can be utilized as an ultrasonic proximity sensor.

According to the exemplary implementations of the invention, by not including a front speaker, an ultrasonic wave emitter of an ultrasonic proximity sensor, and an ultrasonic wave detector of an ultrasonic proximity sensor on the front side of a display device, the display may have an increased area where an image is displayed on the front surface of the display device, with a reduced cost.

Additional features of the inventive concepts will be set forth in the description which follows, and in part will be apparent from the description, or may be learned by practice of the inventive concepts.

According to one or more embodiments of the invention, a sound generator for a display device includes: a first vibration generation unit having a first electrode, a second electrode, and a first vibration layer between the first electrode and the second electrode; and a second vibration generation unit having a third electrode, a fourth electrode, and a second vibration layer between the third electrode and the fourth electrode; wherein the first vibration generation unit is configured to contract and expand the first sub-vibration layer based on a first driving voltage applied to the first electrode and a second driving voltage applied to the second electrode, and wherein the second vibration generation unit is configured to contract and expand the second sub-vibration layer based on a third driving voltage applied to the third electrode and a fourth driving voltage applied to the fourth electrode.

An area of the first sub-vibration layer in a thickness direction of the first vibration layer may be larger than an area of the second sub-vibration layer in the thickness direction of the second vibration layer.

An area of the first sub-vibration layer in a width direction of the first vibration layer may be larger than an area of the second sub-vibration layer in the width direction of the second vibration layer.

The first electrode may include a fist stem electrode and first branch electrodes extending from the first stem electrode, and the second electrode may include a second stem electrode and second branch electrodes extending from the second stem electrode.

The first branch electrodes and the second branch electrodes may be arranged substantially in parallel with each other, and may be arranged alternately in a thickness direction of the first vibration layer.

The third electrode may include a third stem electrode and third branch electrodes extending from the third stem electrode, and the fourth electrode may include a fourth stem electrode and fourth stem electrodes extending from the fourth stem electrode.

The number of the first branch electrodes or the number of the second branch electrodes may be larger than the number of the third branch electrodes or the number of the fourth branch electrodes.

The first sub-vibration layer and the second sub-vibration layer may be arranged in a line in a thickness direction of the sound generator.

The first stem electrode and the second stem electrode may be disposed on one side surface of the first vibration layer, and the third stem electrode and the fourth stem electrode may be disposed on the other side surface of the second vibration layer.

The first stem electrode and the second stem electrode may be disposed on one side surface of the first vibration layer, the third stem electrode may be disposed in a first contact hole penetrating the second vibration layer to be connected to the third branch electrodes, and the fourth stem electrode may be disposed in a second contact hole penetrating the second vibration layer to be connected to the fourth branch electrodes.

The first sub-vibration layer and the second sub-vibration layer may be arranged in a width direction of the first vibration layer substantially perpendicular to a thickness direction of the first vibration layer.

The first stem electrode may be disposed in a first contact hole penetrating the first vibration layer to be connected to the first branch electrodes, the second stem electrode may be disposed on one side surface of the first vibration layer, the third stem electrode may be disposed on the other side surface of the second vibration layer, and the fourth stem electrode may be disposed in a second contact hole penetrating the second vibration layer to be connected to the fourth branch electrodes.

The third stem electrode may be disposed in a third contact hole penetrating the second vibration layer to be connected to the third branch electrodes, and the fourth stem electrode may be disposed in a fourth contact hole penetrating the second vibration layer to be connected to the fourth branch electrodes.

The first vibration generation unit may be a sound output unit configured to generate an audible sound, and the second vibration generation unit may be an ultrasonic wave output unit configured to generate an ultrasonic wave.

According to one or more embodiments of the invention, a display device, including: a display panel; and a sound generator including a sound output unit configured to vibrate the display panel to generate a sound and an ultrasonic wave output unit configured to vibrate the display panel to generate an ultrasonic wave, wherein an area of the sound output unit is larger than an area of the ultrasonic wave output unit.

The sound output unit may include: a first electrode to which a first driving voltage is applied; a second electrode to which a second driving voltage is applied; and a first sub-vibration layer disposed between the first electrode and the second electrode, wherein the first sub-vibration layer may be configured to contracts and expand based on the first driving voltage applied to the first electrode and the second driving voltage applied to the second electrode.

The ultrasonic wave output unit may include: a third electrode to which a third driving voltage is applied; a fourth electrode to which a fourth driving voltage is applied; and a second sub-vibration layer disposed between the third electrode and the fourth electrode, wherein the second sub-vibration layer may be configured to contract and expand based on the third driving voltage applied to the third electrode and the fourth driving voltage applied to the fourth electrode.

The sound generator may further include: a first pad electrode connected to the first electrode and a second pad electrode connected to the second electrode; and a third pad electrode connected to the third electrode and a fourth electrode connected to the fourth electrode.

The display device may further include: a sound circuit board connected to the first pad electrode, the second pad electrode, the third pad electrode, and the fourth pad electrode; a middle frame disposed under the display panel and having a first through-hole; and a main circuit board disposed under the middle frame and having a sound connector, wherein the sound circuit board may pass through the first through-hole to be connected to the sound connector.

The main circuit board may further include: a first sound driver configured to transmit the first driving voltage and the second driving voltage to the sound generator; and a second sound driver configured to transmit the third driving voltage and the fourth driving voltage to the sound generator.

The display device may further include: a first microphone configured to sense a sound wave and an ultrasonic wave; and a second microphone configured to sense the sound wave and the ultrasonic wave, wherein a distance between the sound generator and the first microphone may be different from a distance between the sound generator and the second microphone.

According to one or more embodiments of the invention, a method of driving a display device having a display panel, a touch sensor panel, a sound generator including a sound output unit and an ultrasonic wave output unit, at least one microphone includes: vibrating the display panel using the sound output unit of the sound generator in a sound output mode to generate a sound; vibrating the display panel using the ultrasonic wave output unit of the sound generator in a proximity sensing mode to generate an ultrasonic wave; and sensing an ultrasonic wave reflected by an object using the at least one microphone.

The method of driving the display device may further include locating whether the object is located close to the display device in response to the ultrasonic wave being sensed by the at least one microphone.

The method of driving the display device may further include turning off the display panel and the touch sensor panel in response to locating the object in close proximity to the display device.

The sensing of the ultrasonic wave may include locating the object as being in close proximity to the display device in response to a first microphone among the at least one microphone sensing the ultrasonic wave reflected by the object within a first threshold time and a second microphone among the at least one microphone sensing the ultrasonic wave reflected by the object within a second threshold time.

The sensing of the ultrasonic wave may include locating the object as being in close proximity to the display device in response to a first microphone among the at least one microphone sensing the ultrasonic wave reflected by the object within a first threshold time, a second microphone among the at least one microphone not sensing the ultrasonic wave reflected by the object within a second threshold time, and the second microphone sensing the ultrasonic wave reflected by the object within a third threshold time.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION THE EMBODIMENT

Figure 1:
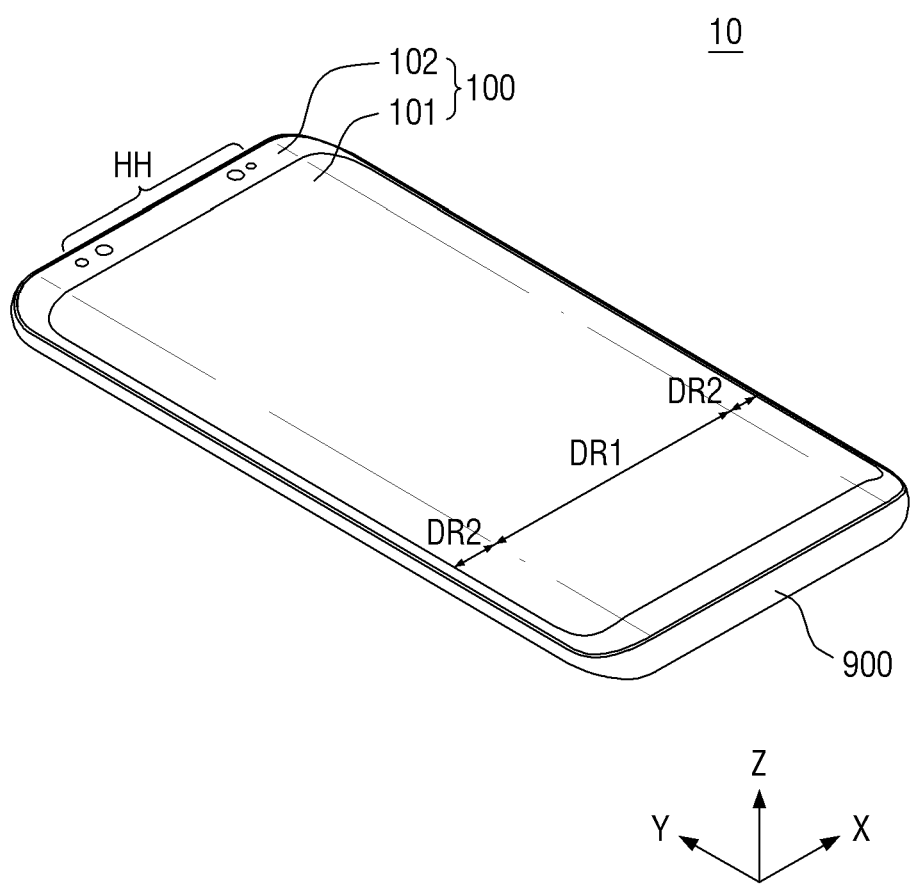
FIG. 1 is a perspective view of a display device constructed according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
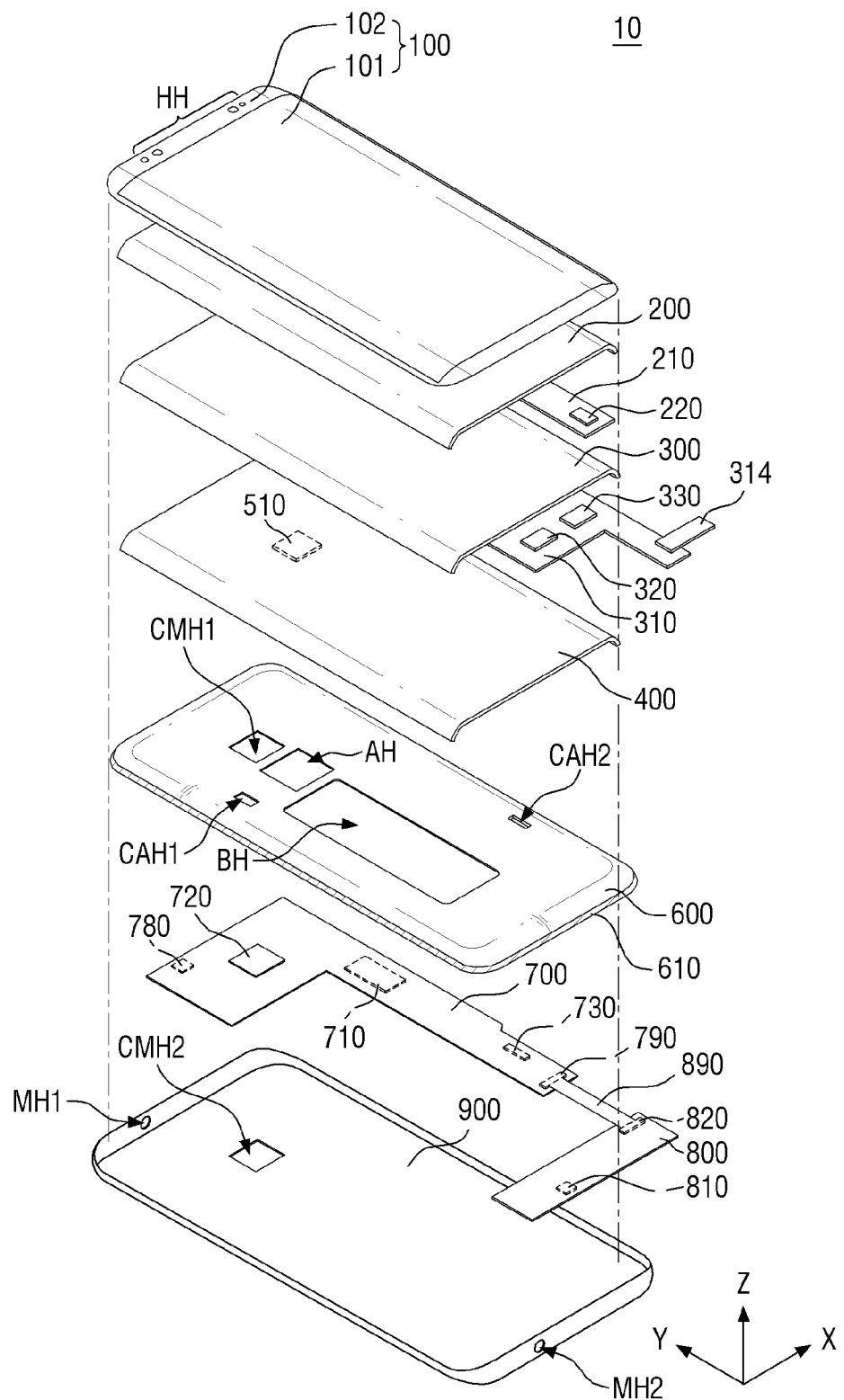
FIG. 2 is an exploded perspective view of a display device constructed according to an exemplary embodiment.

FIG. 1 is a perspective view of a display device 10 constructed according to an exemplary embodiment. FIG. 2 is an exploded perspective view of a display device 10 constructed according to an exemplary embodiment.

Referring to FIGS. 1 and 2, a display device 10 according to an exemplary embodiment includes a cover window 100, a touch sensing unit 200, a touch circuit board 210, a touch driving unit 220, a display panel 300, a display circuit board 310, a display driving unit 320, a panel lower member 400, a sound generator 510, a middle frame 600, a main circuit board 700, an auxiliary circuit board 800, and a lower cover 900.

In this specification, the "on", "over", "top", "upper side", or "upper surface" refers to a direction in which the cover window 100 is disposed, that is, a Z-axis direction, with respect to the display panel 300, and the "beneath", "under", "bottom", "lower side", or "lower surface" refers to a direction in which the middle is frame 600 is disposed, that is, a direction opposite to the Z-axis direction, with respect to the display panel 300. Further, the "left", "right", "upper", and "lower" refer to directions when the display panel 300 is viewed from the plane. For example, the "left" refers to a direction opposite to the X-axis direction, the "right" refers to the X-axis direction, the "upper" refers to the Y-axis direction, and the "lower" refers to a direction opposite to the Y-axis direction.

The display device 10 may have a rectangular shape in a plan view in the Z-axis direction. For example, as shown in FIGS. 1 and 2, the display device 10 may have a rectangular planar shape having short sides in the first direction (X-axis direction) and long sides in the second direction (Y-axis direction). The edge where the short side in the first direction (X-axis direction) meets the long side in the second direction (Y-axis direction) may be formed to have a round shape of a predetermined curvature or have a right angle shape. The planar shape of the display device 10 is not limited to a rectangular shape, and may be formed in another polygonal shape, circular shape, or elliptical shape.

The display device 10 may include a first area DR1 formed flat and a second area DR2 extending from the right and left sides of the first area DR1. The second area DR2 may be formed to be flat or curved. When the second area DR2 is formed to be flat, the angle formed by the first area DR1 and the second area DR2 may be an obtuse angle.

When the second area DR2 formed to be curved, the second area DR2 may have a constant curvature or a variable curvature.

FIG. 1 illustrates that the second area DR2 extends from the left and right sides of the first area DR1, but the exemplary embodiments are not limited thereto. That is, the second area DR2 may extend from only one of the left and right sides of the first area DR1. In addition, the second area DR2 may extend from only one of the upper and lower sides of the first area DR1 as well as only one of the left and right sides of the first area DR1. Hereinafter, it is assumed that the second area DR2 is disposed along the left and right edges of the display device 10.

Figure 11:
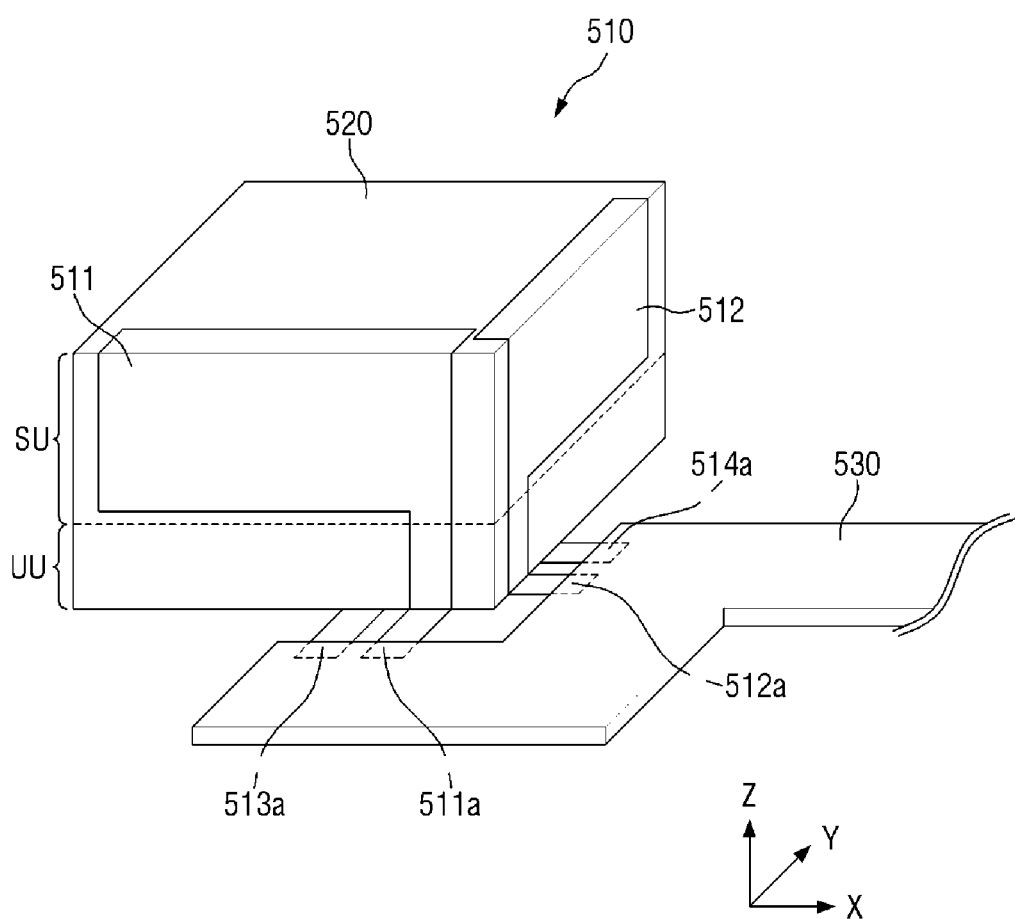
FIG. 11 is a perspective view showing another example of the sound generator of FIG. 6.

The cover window 100 may be disposed on the display panel 300 to cover the upper surface of the display panel 300. Thus, the cover window 100 may function to protect the upper surface of the display panel 300. The cover window 100 may be attached to the touch sensing unit 200 through a first adhesive member 910 as shown in FIG. 11. The first adhesive member 910 may be an optically clear adhesive (OCA) film or an optically clear resin (OCR) film.

The cover window 100 may include a light transmitting area 101 corresponding to the display panel 300 and a light blocking area 102 corresponding to an area other than the display panel 300. The cover window 100 may be disposed in the first area DR1 and the second area DR2, and the light transmitting area 101 may be disposed in a part of the first area DR1 and a part of the second area DR2. The light blocking area 102 may be formed to be opaque. Or, the light blocking area 102 may be formed as a decorative layer having a pattern that can be seen to a user when an image is not displayed. For example, a company logo or various characters may be patterned on the light blocking area 102. Further, the light blocking area 102 may be provided with a plurality of holes HH for exposing a front camera, a front speaker, an infrared sensor, an iris recognition sensor, an ultrasonic sensor, an illuminance sensor, or the like, but the exemplary embodiments are not limited thereto. For example, at least one of a front camera, a front speaker, an infrared sensor, an iris recognition sensor, an ultrasonic sensor, and an illuminance sensor may be mounted in the display panel 300. In this case, some or all of the plurality of holes HH may be omitted.

The cover window 100 may be made of glass, sapphire, and/or plastic. The cover window 100 may be rigid or flexible.

The touch sensing unit 200 may be disposed between the cover window 100 and the display panel 300. The touch sensing unit 200 may be disposed in the first area DR1 and the second area DR2. Thus, the touch sensing unit 200 may sense a user's touch in the second areas DR2 as well as the first area DR 1.

Figure 6:
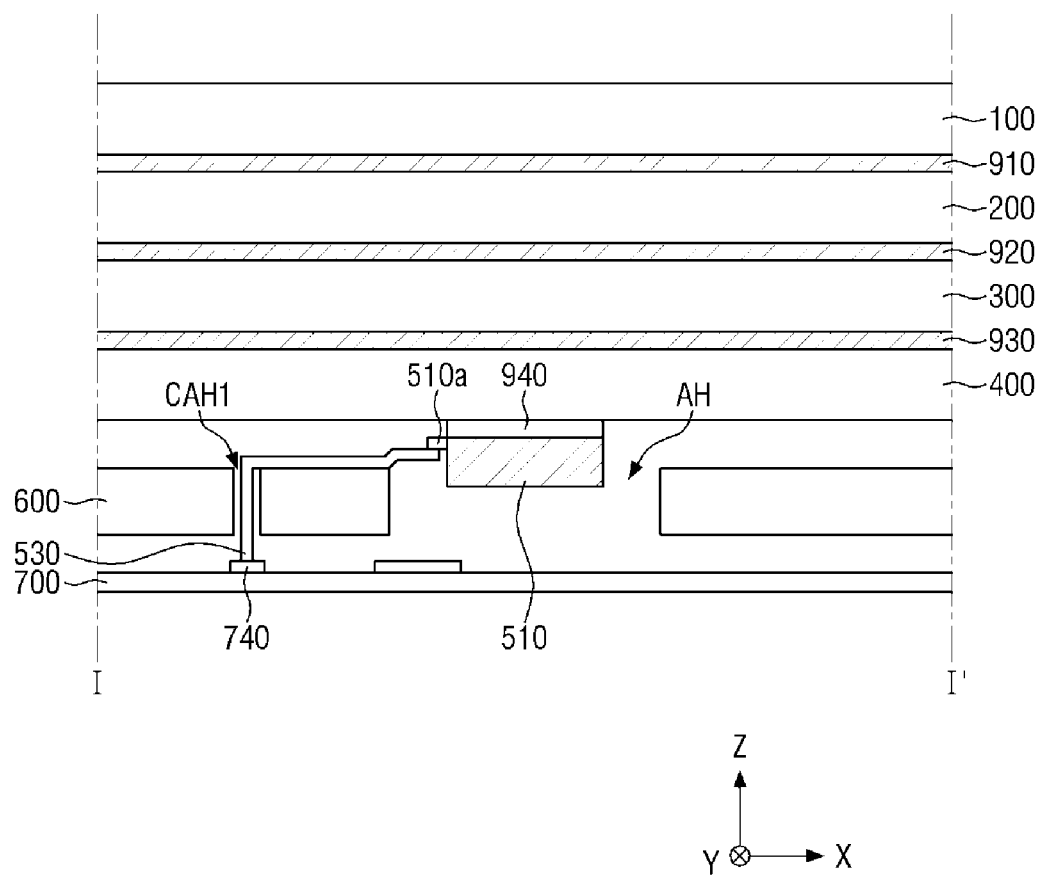
FIG. 6 is a cross-sectional view of the display device taken along a sectional line I-I' of FIGS. 3, 4, and 5.

The touch sensing unit 200 may be attached to the lower surface of the cover window 100 through the first adhesive member 910 as shown in FIG. 6. The touch sensing unit 200 may be additionally provided thereon with a polarizing film in order to prevent or reduce the deterioration of visibility due to the reflection of external light. In this case, the polarizing film may be attached to the lower surface of the cover window 100 through the first adhesive member 910.

The touch sensing unit 200 is a unit for sensing a touch position of a user, and may be implemented as a capacitive type such as a self-capacitance type or a mutual capacitance type. When touch sensing unit 200 is implemented as a self-capacitive type, the touch sensing unit 200 may include only the touch driving electrodes, but when the touch sensing unit 200 is implemented as a mutual capacitance type, the touch sensing unit 200 may include both the touch driving electrodes and the touch sensing electrodes. Hereinafter, the touch sensing unit 200 will be described, assuming that the touch sensing unit 200 is implemented as a mutual capacitance type.

The touch sensing unit 200 may be a panel type or a film type. In this case, the touch sensing unit 200 may be attached onto a thin encapsulation film of the display panel 300 through a second adhesive member 920 as shown in FIG. 6. The second adhesive member 920 may be an optically clear adhesive (OCA) film or an optically clear resin (OCR) film.

The touch sensing unit 200 may be formed integrally with the display panel 300. In this case, the touch driving electrodes and touch sensing electrodes of the touch sensing unit 200 may be disposed on the thin encapsulation film of the display panel 300 or the encapsulation substrate and encapsulation film covering the light emitting element layer of the display panel 300.

The touch circuit board 210 may be attached to one side of the touch sensing unit 200. Specifically, the touch circuit board 210 may be attached onto pads provided on one end of the touch sensing unit 200 using an anisotropic conductive film. Further, the touch circuit board 210 may be provided with a touch connection portion on the other end of the touch sensing unit 200, and the touch connection portion may be connected to a touch connector 312a of the display circuit board 310. The touch circuit board 210 may be a flexible printed circuit board.

The touch driving unit 220 may apply touch driving signals to the touch driving electrodes of the touch sensing unit 200, sense sensing signals from the touch sensing electrodes of the touch sensing unit 200, and analyze the sensing signals to calculate a touch position of the user. The touch driving unit 220 may be formed as an integrated circuit and mounted on the touch circuit board 210.

The display panel 300 may be disposed under the touch sensing unit 200. The display panel 300 may be disposed to overlap the light transmitting area 101 of the touch sensing unit 200. The display panel 300 may be disposed in the first area DR1 and the second areas DR2. Thus, the image of the display panel 300 may be seen not only in the first area DR1 but also in the second areas DR2.

Figure 26:
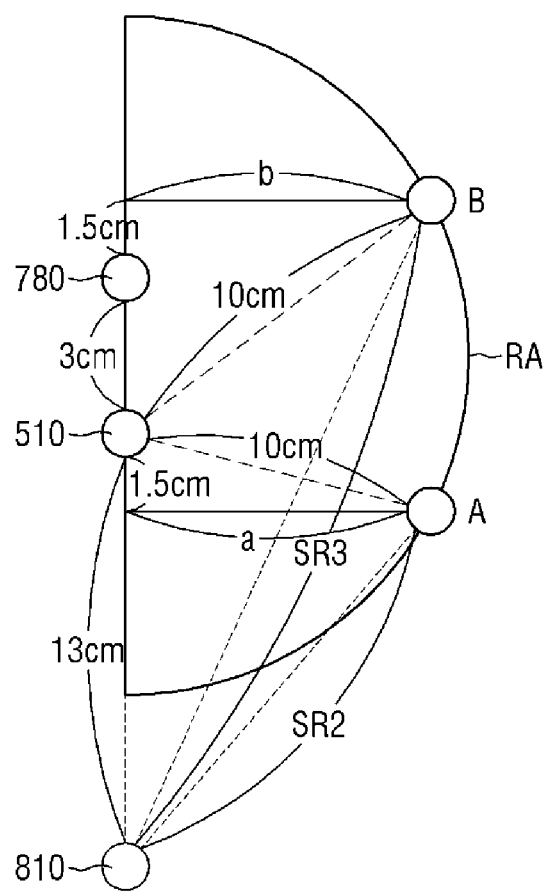

The display panel 300 may be a light emitting display panel including a light emitting element. Examples of the display panel 300 may include an organic light emitting display panel using an organic light emitting diode, an ultra-small light emitting diode display panel using a micro LED, or a quantum dot light emitting diode display panel using a quantum dot light emitting diode. Hereinafter, it is assumed that the display panel 300 is an organic light emitting display panel as shown in FIG. 26.

Figure 27:
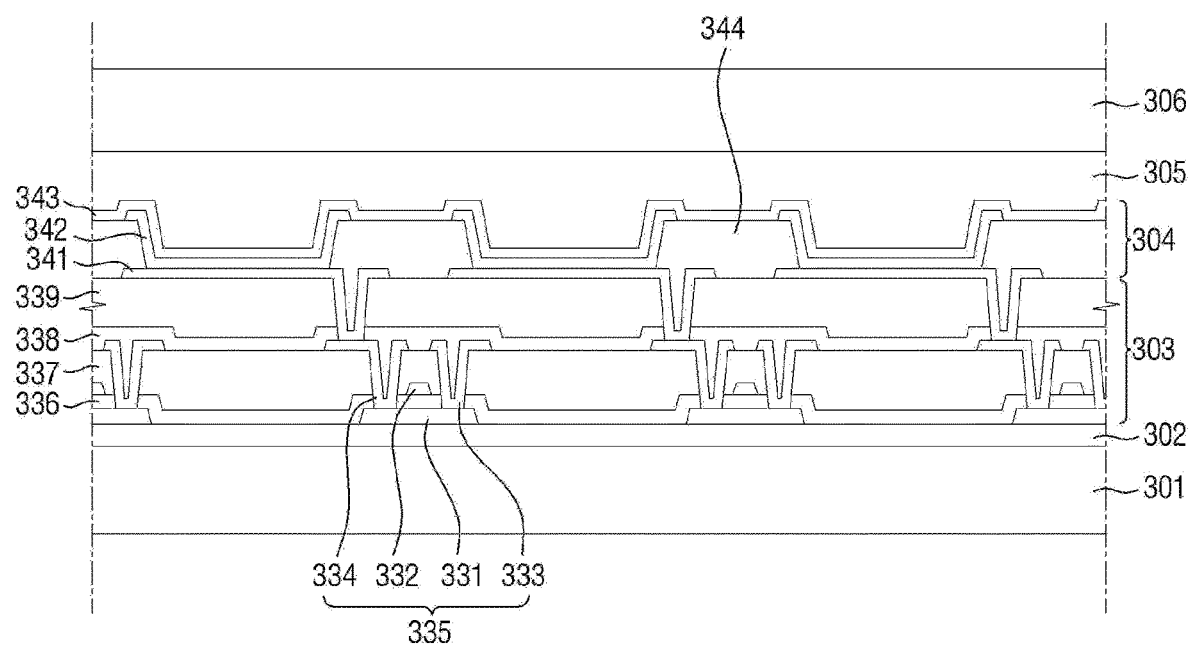
FIG. 27 is a cross-sectional view specifically the display area of the display panel, according to an exemplary embodiment.

Referring to FIG. 27, the display area DA of the display panel 300 refers to an area where a light emitting element layer 304 is formed to display an image, and the non-display area NDA thereof refers to an area around the display area DA.

The display panel 300 may include a support substrate 301, a flexible substrate 302, a thin film transistor layer 303, a light emitting element layer 304, an encapsulation layer 305, and a barrier film 306.

The flexible substrate 302 is disposed on the support substrate 301. Each of the support substrate 301 and the flexible substrate 302 may include a polymer material having flexibility. For example, each of the support substrate 301 and the flexible substrate 302 may include polyethersulphone (PES), polyacrylate (PA), polyarylate (PAR), polyetherimide (PEI), polyethylenenapthalate (PEN), polyethylene terepthalate (PET), polyphenylenesulfide (PPS), polyallylate, polyimide (PI), polycarbonate (PC), cellulosetriacetate (CAT), cellulose acetate propionate (CAP), or a combination thereof.

The thin film transistor layer 303 is disposed on the flexible substrate 302. The thin film transistor layer 303 includes thin film transistors 335, a gate insulating film 336, an interlayer insulating film 337, a protective film 338, and a planarization film 339.

A buffer film may be formed on the flexible substrate 302. The buffer film may be formed on the flexible substrate 302 so as to protect thin film transistors 335 and light emitting elements from moisture penetrating through the support substrate 301 and the flexible substrate 302 which are vulnerable to moisture. The buffer film may be formed of a plurality of alternately laminated inorganic films. For example, the buffer film may be formed of a multi-layer film in which one or more inorganic layers including one or more of a silicon oxide (SiOx), a silicon nitride (SiNx), and SiON are alternately stacked. The buffer film may be omitted.

The thin film transistor 335 is formed on the flexible substrate 302 and the buffer film. The thin film transistor 335 includes an active layer 331, a gate electrode 332, a source electrode 333, and a drain electrode 334. FIG. 27 illustrates that the thin film transistor 335 is formed by a top gate manner in which the gate electrode 332 is located on the active layer 331, but the exemplary embodiments are not limited thereto. That is, the thin film transistor 335 may be formed by a bottom gate manner in which the gate electrode 332 is located beneath the active layer 331, or may be formed by a double gate manner in which the gate electrode 332 is located both on and beneath the active layer 331.

The active layer 331 is formed on the buffer film. The active layer 331 may be formed of a silicon-based semiconductor material or an oxide-based semiconductor material. A light blocking layer for blocking external light incident on the active layer 331 may be formed between the buffer film and the active layer 331.

The gate insulating film 336 may be formed on the active layer 331. The gate insulating film 336 may be formed of an inorganic film, for example, a silicon oxide (SiOx) film, a silicon nitride (SiNx) film, or a combination thereof.

The gate electrode 332 and a gate line may be formed on the gate insulating film 336. The gate electrode 332 and the gate line may be formed of a single layer or a multi-layer including at least one of molybdenum (Mo), aluminum (Al), chromium (Cr), gold (Au), titanium (Ti), nickel (Ni), neodymium (Nd) and copper (Cu), or an alloy thereof.

The interlayer insulating film 337 may be formed on the gate electrode 332 and the gate line. The interlayer insulating film 337 may be formed of an inorganic film, for example, a silicon oxide (SiOx) film, a silicon nitride (SiNx) film, or a combination thereof.

The source electrode 333, the drain electrode 334, and a data line may be formed on the interlayer insulating film. Each of the source electrode 333 and the drain electrode 334 may be connected to the active layer 331 through a contact hole penetrating the gate insulating film 336 and the interlayer insulating film 337. The source electrode 333, the drain electrode 334, and the data line may be formed of a single layer or a multi-layer including at least one of molybdenum (Mo), aluminum (Al), chromium (Cr), gold (Au), titanium (Ti), nickel (Ni), neodymium (Nd) and copper (Cu), or an alloy thereof.

The protective film 338 for insulating the thin film transistor 335 may be formed on the source electrode 333, the drain electrode 334, and the data line. The interlayer insulating film 338 may be formed of an inorganic film, for example, a silicon oxide (SiOx) film, a silicon nitride (SiNx) film, or a combination thereof.

The planarization film 339 for flattening a step due to the thin film transistor 335 may be formed on the protective film 338. The planarization film 339 may be formed of an organic film including an acryl resin, an epoxy resin, a phenolic resin, a polyamide resin, or a polyimide resin.

The light emitting element layer 304 is formed on the thin film transistor layer 303. The light emitting element layer 304 includes light emitting elements and a pixel defining film 344.

The light emitting elements and the pixel defining film 344 are formed on the planarization film 339. The light emitting element may be an organic light emitting element. In this case, the light emitting element may include an anode electrode 341, a light emitting layer 342, and a cathode electrode 343.

The anode electrode 341 may be formed on the planarization film 339. The anode electrode 341 may be connected to the source electrode 333 of the thin film transistor 335 through a contact hole penetrating the protective film 338 and the planarization film 339.

The pixel defining film 344 may be formed on the planarization film 339 to cover the edge of the anode electrode 341 to define pixels. That is, the pixel defining film 344 serves to define pixels. Each of the pixels refers to an area where the anode electrode 341, the light emitting layer 342, and the cathode electrode 343 are sequentially laminated, and holes from the anode electrode 341 and electrons from the cathode electrode 343 are combined with each other in the light emitting layer 342 to emit light.

The light emitting layer 342 is formed on the anode electrode 341 and the pixel defining film 344. The light emitting layer 342 is an organic light emitting layer. The light emitting layer 342 may emit one of red light, green light, and blue light. The peak wavelength range of red light may be about 620 nm to 750 nm, and the peak wavelength range of green light may be about 495 nm to 570 nm. Further, the peak wavelength range of blue light may be about 450 nm to 495 nm. The light emitting layer 342 may be a white light emitting layer that emits white light. In this case, the light emitting layer 342 may have a laminate structure of a red light emitting layer, a green light emitting layer, and a blue light emitting layer, and may be a common layer formed commonly in the pixels. In this case, the display panel 300 may further include color filters for displaying red, green, and blue colors.

The light emitting layer 342 may include a hole transporting layer, a light emitting layer, and an electron transporting layer. Further, the light emitting layer 342 may be formed to have a tandem structure of two stacks or more, and in this case, a charge generating layer may be formed between the stacks.

The cathode electrode 343 is formed on the light emitting layer 342. The second electrode 343 may be formed to cover the light emitting layer 342. The second electrode 343 may be a common layer formed commonly in the pixels.

When the light emitting element layer 304 is formed by a top emission manner in which light is emitted upward, the anode electrode 341 may be formed of a high-reflectance metal material such as a laminate structure (Ti/Al/Ti) of aluminum and titanium, a laminate structure (ITO/Al/ITO) of aluminum and TIO, an APC alloy, or a laminate structure (ITO/APC/ITO) of an APC alloy and ITO. The APC alloy may be an alloy of silver (Ag), palladium (Pd), and copper alloy (Cu). The cathode electrode 263 may be formed of a transparent conductive material (TCO) such as ITO or IZO, which is light-transmissive, or a semi-transmissive conductive material such as magnesium (Mg), silver (Ag), or an alloy of magnesium (Mg) and silver (Ag). When the cathode electrode 343 is formed of a semi-transmissive conductive material, light emission efficiency may be increased by a microcavity.

When the light emitting element layer 304 is formed by a bottom emission manner in which light is emitted downward, the anode electrode 341 may be formed of a transparent conductive material (TCO) such as ITO or IZO, or a semi-transmissive conductive material such as magnesium (Mg), silver (Ag), or an alloy of magnesium (Mg) and silver (Ag). The second electrode 343 may be formed of a high-reflectance metal material such as a laminate structure (Ti/Al/Ti) of aluminum and titanium, a laminate structure (ITO/Al/ITO) of aluminum and TIO, an APC alloy, or a laminate structure (ITO/APC/ITO) of an APC alloy and ITO. When the anode electrode 341 is formed of a semi-transmissive conductive material, light emission efficiency may be increased by a microcavity.

The encapsulation layer 305 is formed on the light emitting element layer 304. The encapsulation layer 305 serves to prevent or reduce oxygen or moisture from permeating the light emitting layer 342 and the cathode electrode 343. For this purpose, the encapsulation layer 305 may include at least one inorganic film. The inorganic film may be formed of silicon nitride, aluminum nitride, zirconium nitride, titanium nitride, hafnium nitride, tantalum nitride, silicon oxide, aluminum oxide, or titanium oxide. The encapsulation layer 305 may further include at least one organic film. The organic film may be formed to have a sufficient thickness to prevent or reduce foreign matter (particles) from penetrating the encapsulation layer 305 and entering the light emitting layer 342 and the cathode electrode 343. The organic film may include any one of epoxy, acrylate, and urethane acrylate.

The display circuit board 310 may be attached to one side of the display panel 300. Specifically, the display circuit board 310 may be attached onto pads provided on one side of the display panel 300 using an anisotropic conductive film. The display circuit board 310 may be bent downward from the upper portion of the display panel 300. The touch circuit board 210 may also be bent downward from the upper portion of the display panel 300. Thus, the touch connection portion provided at one end of the touch circuit board 210 may be connected to the touch connector 312a of the display circuit board 310. Details of the display circuit board 310 will be described later with reference to FIGS. 3, 4, and 5.

The display driving unit 320 transmits signals and voltages for driving the display panel 300 through the display circuit board 310. The display driving unit 320 may be formed as an integrated circuit and mounted on the display circuit board 310, but the exemplary embodiments are not limited thereto. For example, the display driving unit 320 may be attached directly to the substrate of the display panel 300. In this case, the display driving unit 320 may be attached to the upper surface or lower surface of the display panel 300.

The panel lower member 400 may be disposed under the display panel 300. The panel lower member 400 may be attached to the lower surface of the display panel 300 through the third adhesive member 930. The third adhesive member 930 may be an optical clear adhesive (OCA) film or an optical clear resin (OCR) film.

The panel lower member 400 may include at least one of a light absorbing member for absorbing external light, a buffer member for absorbing an external impact, a heat dissipating member for efficiently emitting heat of the display panel 300, and a light blocking layer for blocking external light.

The light absorbing member may be disposed under the display panel 300. The light absorbing member inhibits the transmission of light to prevent or reduce components disposed under the light absorbing member, that is, a sound generator 510, a display circuit board 310, and the like from being viewed from above the display panel 300. The light absorbing member may include a light absorbing material such as a black pigment or a dye.

The buffer member may be disposed under the light absorbing member. The buffer member absorbs an external impact to prevent or reduce the display panel 300 from being damaged. The buffer member may be composed of a single layer or a plurality of layers. For example, the buffer member may be formed of a polymer resin such as polyurethane, polycarbonate, polypropylene, or polyethylene, or may be formed of an elastic material such as a rubber, a urethane material, or a sponge formed by foaming an acrylic material. The buffer member may be a cushion layer.

The heat dissipating member may be disposed under the buffer member. The heat dissipating member may include a first heat dissipating layer including graphite or carbon nanotubes and a second heat dissipating layer capable of blocking electromagnetic waves and formed of a metal thin film of copper, nickel, ferrite or silver having excellent thermal conductivity.

The sound generator 510 may take the form of a speaker, vibrator, actuator, ultrasonic wave generator, or any other device that can generate vibration in response to an acoustic signal. Some specific examples of the type of sound generating devices that may be employed include those discussed herein. For example, the sound generator 510 may be disposed under the panel lower member 400. The sound generator 510 may be disposed to overlap the panel lower member 400. In this case, the sound generator 510 may be attached to the lower surface of the panel lower member 400. The sound generator 510 may be attached to the lower surface of the panel lower member 400 through a fourth adhesive member 940. The fourth adhesive member 940 may be a pressure sensitive adhesive (PSA) member.

Figure 28:
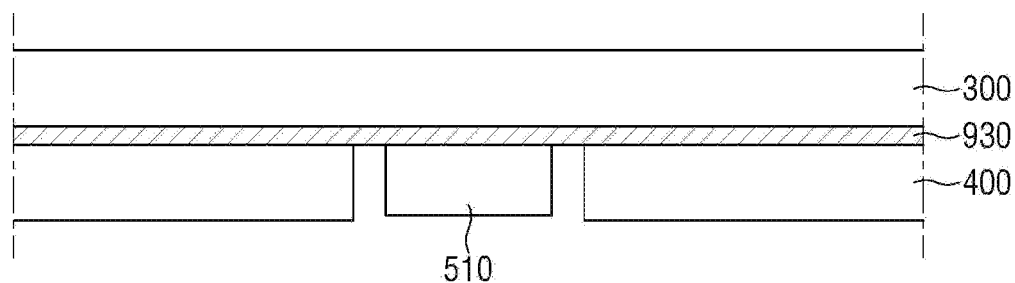
FIG. 28 is a cross-sectional view showing a panel lower member and a first sound, generator according to an exemplary embodiment.

Meanwhile, when the sound generator 510 is disposed on the heat dissipating member of the panel lower member 400, the first heat dissipating layer or the second heat dissipating layer of the heat dissipating member may be broken by the vibration of the sound generator 510. Therefore, in the area where the sound generator 510 is disposed, the heat dissipating member may be removed, and in this case, the sound generator 510 may be disposed on the buffer member. As shown in FIG. 28, in the area where the sound generator 510 is disposed, the panel lower member 400 may be removed, and in this case, the sound generator 510 may be disposed on the lower surface of the display panel 300.

The sound generator 510 may include a piezoelectric actuator. In this case, the sound generator 510 may vibrate by applying an alternating voltage to shrink and expand the piezoelectric actuator. The sound generator 510 may vibrate in the vertical direction (Z-axis direction). In this case, the display panel 300 may be vibrated up and down by the vibration of the sound generator 510, and thus sounds or ultrasonic waves may be generated.

The sound generator 510 may be connected to a sound circuit board 530. Specifically, one end of the sound circuit board 530 may be connected to pad electrodes provided on at least one side of the sound generator 510.

The sound circuit board 530 may be connected to a sound connector 740 of the main circuit board 700 through a first through-hole CAH1 of the middle frame 600. Thus, the sound generator 510 may be connected to the first sound driver 760 and second sound driver 770 of the main circuit board 700. Therefore, the sound generator 510 may vibrate according to the first driving voltage and second driving voltage of the first sound driver 760 to generate sounds, and may vibrate according to the third driving voltage and fourth driving voltage of the second sound driver 770 to generate ultrasonic waves.

The middle frame 600 may be disposed under the panel lower member 400. The middle frame 600 may include a synthetic resin, a metal, or both a synthetic resin and a metal.

The middle frame 600 may include a first camera hole CMH1 into which a camera device 720 is inserted, a battery hole BH through which heat is discharged from a battery, a first through-hole CAH through which the sound circuit board 530 passes, and a second through-hole through which a second connection cable 314 connected to the display circuit board 310 passes. Further, the middle frame 600 may be provided with an accommodation hole AH for accommodating the sound generator 510. The width of the accommodation hole AH is larger than the width of the sound generator 510. When the height of the sound generator 510 is not high, the middle frame 600 may be provided with an accommodation groove instead of the accommodation hole AH. The accommodation hole AH may be integrated with the battery hole BH.

When the sound generator 510 overlaps the battery hole BH in which a battery is disposed, the sound generator 510 may be affected by the heat generated from the battery. Therefore, the sound generator 510 may be disposed not to overlap the battery hole BH.

A waterproofing member 610 may be disposed at the edge of the middle frame 600. The waterproofing member 610 may be attached to the upper surface of the panel lower member 400 and the lower surface of the middle frame 600. Thus, it is possible to prevent or reduce water or dust from penetrating between the display panel 300 and the middle frame 600. That is, a waterproof and dustproof display device 10 may be provided.

Specifically, the waterproofing member 610 may include a base film, a first adhesive film 412 disposed on one surface of the base film, and a second adhesive film disposed on the other surface of the base film. The base film may be a polyethylene terephthalate (PET) film, a polyethylene terephthalate (PET) film and a cushion layer, or a polyethylene foam (PE-foam). Each of the first adhesive film and the second adhesive film may be a pressure-sensitive adhesive (PSA) film. The first adhesive film may be adhered to the lower surface of the panel lower member 400, and the second adhesive film may be adhered to the upper surface of the middle frame 600.

The main circuit board 700 may be disposed under the middle frame 600. The main circuit board 700 may be a printed circuit board or a flexible printed circuit board.

The main circuit board 700 may include a main processor 710, a camera device 720, a main connector 730, a sound connector 740, a first sound driver 760, a second sound driver 770, a first microphone 780, and a first auxiliary connector 790. The sound connector 740, the first sound driver 760, and the second sound driver 770 may be disposed on the upper surface of the main circuit board 700, facing the middle frame 600. The main processor 710, the main connector 730, the first microphone 780, and the first auxiliary connector 790 may be disposed on the lower surface of the main circuit board 700, facing the lower cover 900. Further, the camera device 720 may be disposed on both the upper surface and lower surface of the main circuit board 700.

The main processor 710 may control all the functions of the display device 10. For example, the main processor 710 may transmit image data to the display driving unit 320 of the display circuit board 310 such that the display panel 300 displays an image. The main processor 710 may receive touch data from the touch driving unit 220, determine the touch position of a user, and then execute an application indicated by an icon displayed at the touch position of the user. The main processor 710 may receive touch data from the touch driving unit 220, and may execute an application indicated by an icon displayed at the touch position of the user according to the touch data.

The main processor 710 may transmit sound data to the first sound driver 760 in a sound output mode. The main processor 710 may transmit ultrasonic data to the second sound driver 770 in a proximity sensor output mode.

The main processor 710 may be an application processor, a central processing unit, or a system chip, which includes an integrated circuit.

The camera device 720 processes an image frame such as a still image or a moving image obtained by an image sensor in a camera mode, and transmits the processed image frame to the main processor 710.

The second connection cable 314 may be passed through the second through-hole CAH2 of the middle frame 600 and connected to the main connector 730. Thus, the main circuit board 910 may be electrically connected to the display circuit board 310 and the touch circuit board 210.

The sound circuit board 530 may be passed through the first through-hole CAH1 of the middle frame 600 and connected to the sound connector 740 disposed on the upper surface of the main circuit board 700.

The first sound driver 760 receives sound data from the main processor 710. The first sound driver 760 generates a first driving voltage and a second driving voltage in accordance with the sound data, and transmits the first driving voltage and the second driving voltage to the sound generator 510 through the sound connector 740 and the sound circuit board 530. Thus, the sound generator 510 may vibrate the display panel 300 to generate a sound.

The second sound driver 770 receives ultrasonic data from the main processor 710. The second sound driver 770 generates a third driving voltage and a fourth driving voltage in accordance with the ultrasonic data, and transmits the third driving voltage and the fourth driving voltage to the sound generator 510 through the sound connector 740 and the sound circuit board 530. Thus, the sound generator 510 may vibrate the display panel 300 to generate ultrasonic waves.

Each of the first sound driver 760 and the second sound driver 770 may include a digital signal processor (DSP) for processing digital signals such as sound data and ultrasonic data, a digital-analog converter (DAC) for converting the digital signals processed in the digital signal processor into analog signals such as first and second driving voltages or third and fourth driving voltages, and an amplifier for amplifying the analog signals converted in the digital-analog converter and outputting the amplified analog signals.

The first microphone 780 may be disposed on one side of the display device 10. The first microphone 780 may sense a sound wave and an ultrasonic wave. For example, the first microphone 780 may sense a sound wave having a frequency of lower than 20 kHz and an ultrasonic wave having a frequency of 20 kHz to 50 kHz. Therefore, when the sound generator 510 vibrates the display panel 300 in the proximity sensing mode to generate an ultrasonic wave, the ultrasonic wave reflected by an object may be sensed by the first microphone 780. The first microphones 780 may convert the sensed ultrasonic wave into a first electrical signal and transmit the first electrical signal to the main processor 710.

A third connection cable 890 connected to the auxiliary circuit board 800 may be connected to the first auxiliary connector 790. The main circuit board 700 and the auxiliary circuit board 800 may be electrically connected to each other by the third connection cable 890.

In addition, the main circuit board 700 may be further provided with a mobile communication module capable of transmitting and receiving a radio signal to/from at least one of a base station, an external terminal, and a server. The radio signal may include various types of data depending on a voice signal, a video call signal, or a text/multimedia message transmission/reception.

The auxiliary circuit board 800 may include a second microphone 810 and a second auxiliary connector 820. The second microphone 810 and the second auxiliary connector 820 may be disposed on the lower surface of the main circuit board 700 facing the lower cover 900.

The second microphone 810 may be disposed on a side opposite to one side of the display device 10, the one side being provided with the first microphone 780. The second microphone 810 may sense a sound wave and an ultrasonic wave. For example, the second microphone 810 may sense a sound wave having a frequency of lower than 20 kHz and an ultrasonic wave having a frequency of 20 kHz to 50 kHz. Therefore, when the sound generator 510 vibrates the display panel 300 in the proximity sensing mode to generate an ultrasonic wave, the ultrasonic wave reflected by an object may be sensed by the second microphone 810. The second microphone 810 may convert the sensed ultrasonic wave into a second electrical signal and transmit the second electrical signal to the main processor 710.

The main processor 710 may determine whether an object is located close to the display device 10 on the basis of the first electrical signal of the first microphone 780 and the second electrical signal of the second microphone 810. Details of the proximity sensing method of the main processor 710 will be described later with reference to FIGS. 23, 24, and 25.

A third connection cable 890 connected to the main circuit board 700 may be connected to the second auxiliary connector 820. The main circuit board 700 and the auxiliary circuit board 800 may be electrically connected to each other by the third connection cable 890.

The lower cover 900 may be disposed under the middle frame 600 and the main circuit board 700. The lower cover 900 may be engaged and fixed to the middle frame 600. The lower cover 900 may form a lower surface appearance of the display device 10. The lower cover 900 may include plastic and/or metal.

The lower cover 900 may be provided with a first microhole MH1 at a position at which the first microphone 780 such that the first microphone 780 senses a sound wave or an ultrasonic wave from the outside. Further, the lower cover 900 may be provided with a second microhole MH2 at a position at which the second microphone 810 such that the second microphone 810 senses a sound wave or an ultrasonic wave from the outside.

The lower cover 900 may be provided with a second camera hole CMH2 into which the camera device 720 is inserted to protrude outward. The position of the camera device 720 and the positions of the first and second camera holes CMH1 and CMH2 corresponding to the camera device 720 are limited to the exemplary embodiment shown in FIG. 2.

According to the exemplary embodiment shown in FIGS. 1 and 2, since the sound generator 510 disposed under the display panel 300 vibrates the display panel 300 to provide a sound, the sound generator 510 may be used as a front speaker. Further, the sound generator 510 vibrates the display panel 300 to generate an ultrasonic wave, and senses the ultrasonic wave reflected by an object through the first microphone 780 and the second microphone 810. Thus, the sound generator 510 may be used as an ultrasonic wave generator of an ultrasonic proximity sensor, and the first microphone 780 and the second microphone 810 may be used as an ultrasonic wave detector of an ultrasonic proximity sensor. Accordingly, by not including a front speaker, an ultrasonic wave emitter of an ultrasonic proximity sensor, and an ultrasonic wave detector of an ultrasonic proximity sensor on the front side, the display device 10 may have an increased area where an image is displayed on the front surface of the display device 10, with a reduced cost.

Figure 3:
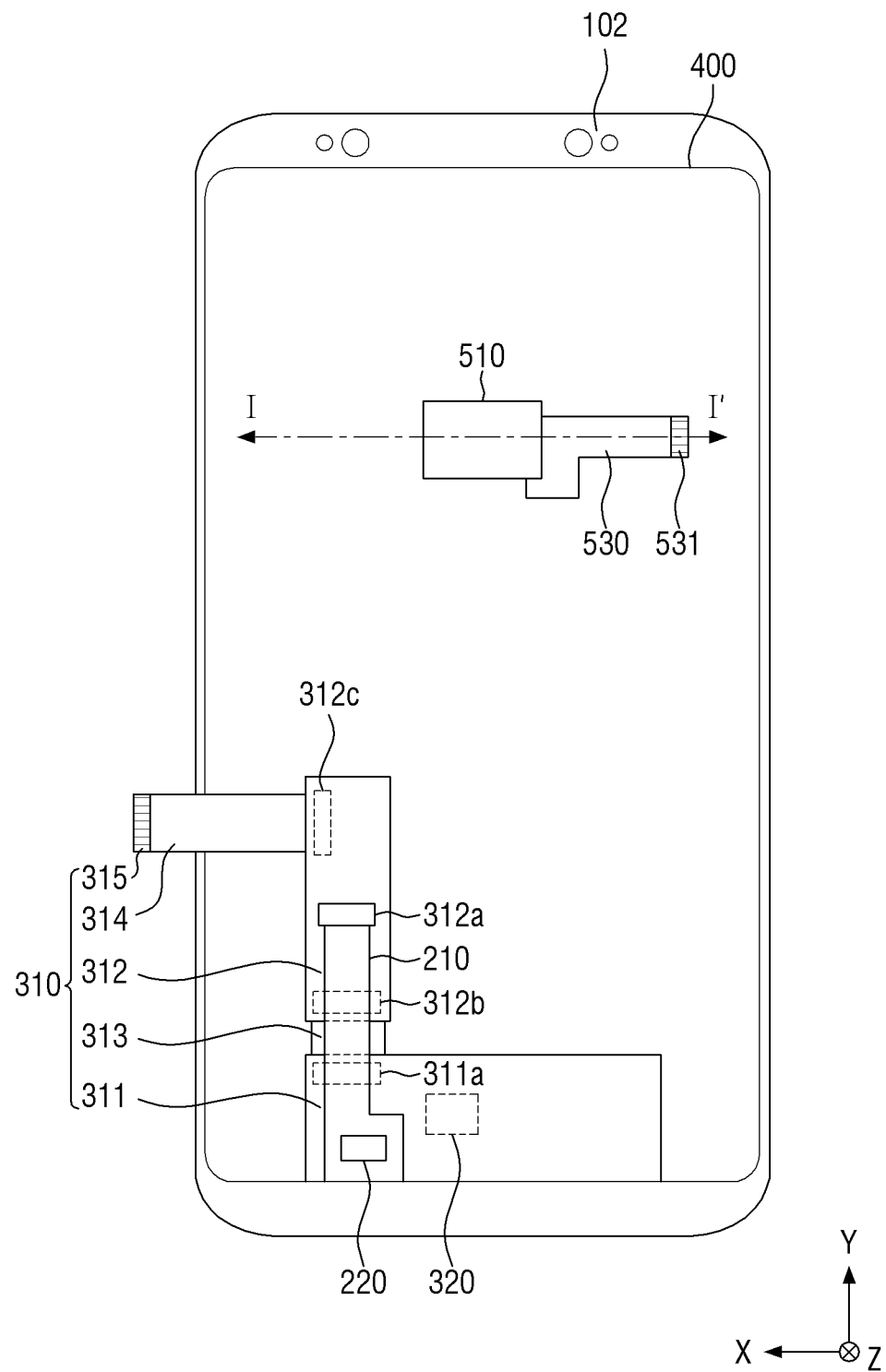
FIG. 3 is a bottom view showing an example of the cover window, the touch circuit board, the display circuit board, the panel lower member, the sound generator, and the sound circuit board of FIG. 2.
Figure 4:
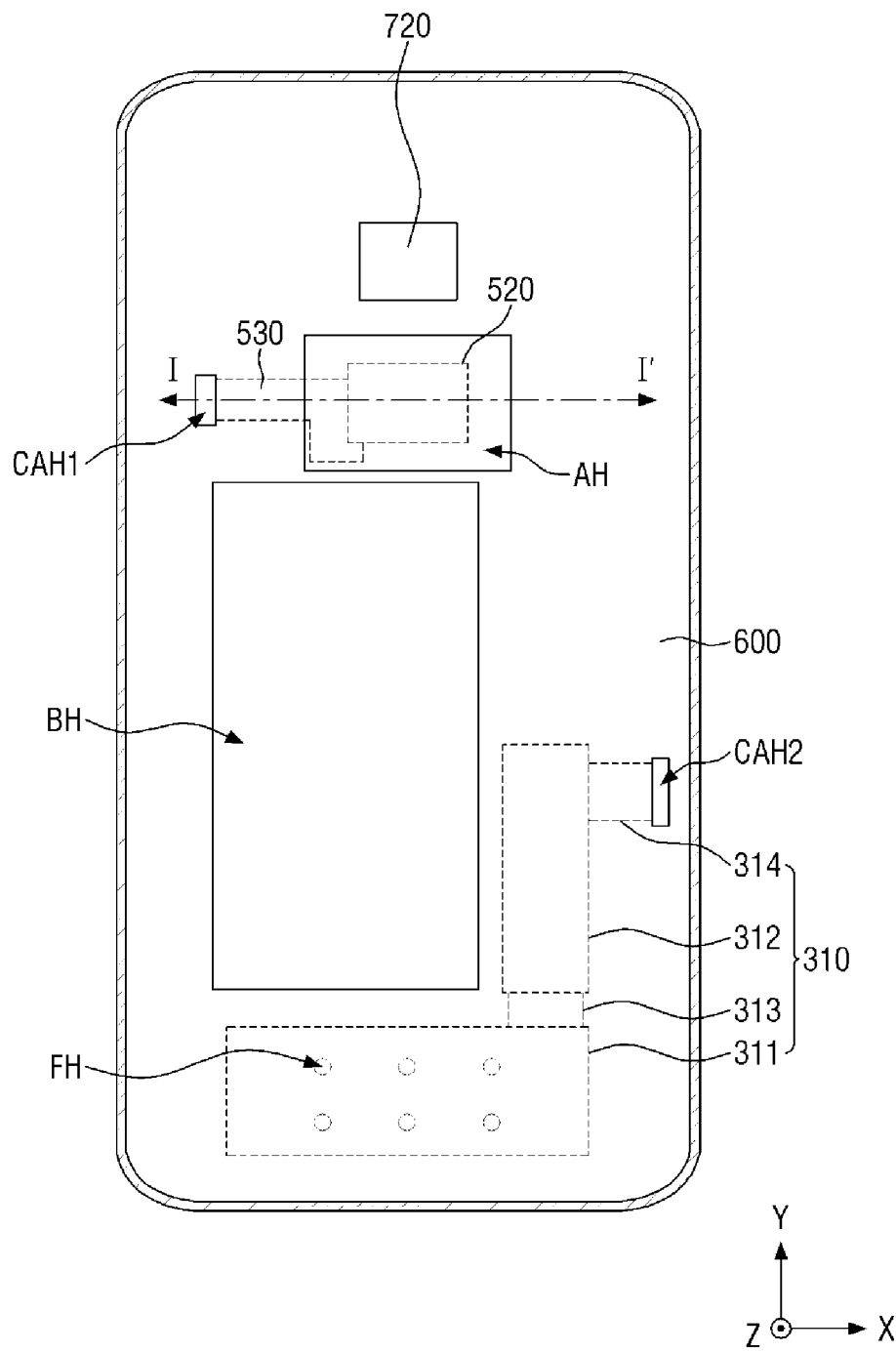
FIG. 4 is plan view showing an example of the display circuit board, the second connection cable, the sound generator, the sound circuit board, and the middle frame of FIG. 2.
Figure 5:
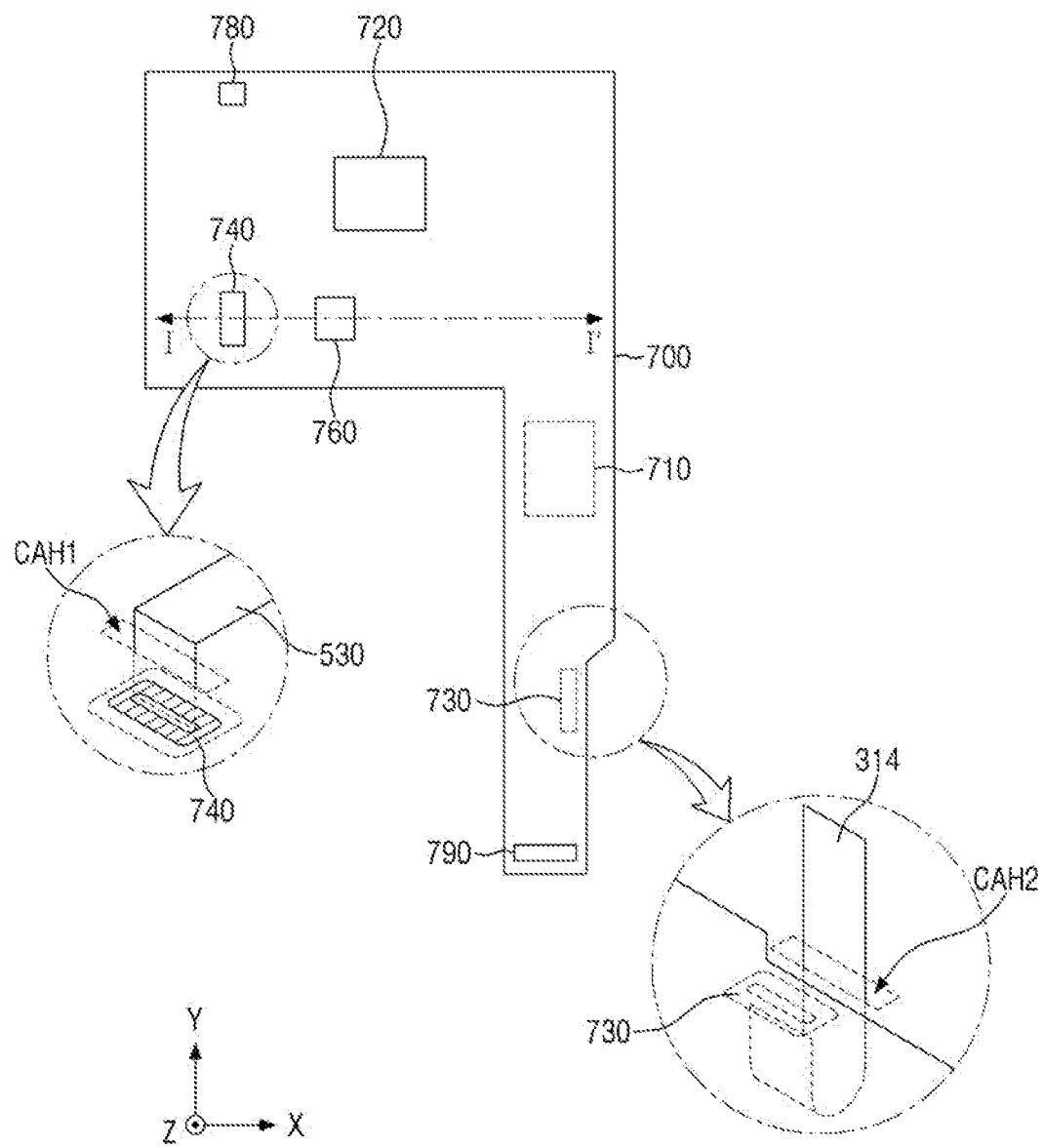
FIG. 5 is a plan view showing an example of the second connection cable, the sound circuit board, and the main circuit board of FIG. 2.

FIG. 3 is a bottom view showing an example of the cover window 100, the touch circuit board 210, the display circuit board 310, the panel lower member 400, the sound generator 510, and the sound circuit board 530 of FIG. 2. FIG. 4 is plan view showing an example of the display circuit board 310, the second connection cable 314, the sound generator 510, the sound circuit board 530, and the middle frame 600 of FIG. 2. FIG. 5 is a plan view showing an example of the second connection cable 314, the sound circuit board 530, and the main circuit board 700 of FIG. 2. FIGS. 4 and 5 are plan views, whereas FIG. 3 is a bottom view. The bottom view may refer to a plan view in Z-axis direction from the lower cover 900 side. Accordingly, it should be noted that the left and right of the display device 10 in FIGS. 4 and 5 are reversed in FIG. 3.

Hereinafter, a method of connecting the sound circuit board 530 connected to the sound generator 510 to the sound connector 740 of the main circuit board 700 and a method of connecting the second connection cable 314 connected to the display circuit board 310 to the main connector 730 of the main circuit board 700 will be described in detail with reference to FIGS. 3, 4, and 5.

Referring to FIGS. 3, 4, and 5, one end of the sound circuit board 530 may be connected to pad electrodes provided on at least one side of the sound generator 510. The other end of the sound circuit board 530 may be provided with a sound connection portion 531. The sound connection portion of the sound circuit board 531 may be connected to the sound connector 740 disposed on the upper surface of the main circuit board 700 through the first through-hole CAH1 of the middle frame 600.

The display circuit board 310 may include a first circuit board 311, a second circuit board 312, and a first connection cable 313.

The first circuit board 311 may be attached to one side of the upper surface or lower surface of the substrate of the display panel 300, and may be bent toward the lower surface of the substrate of the display panel. The first circuit board 311 may be fixed to fixing holes FH formed in the middle frame 600 by fixing members as shown in FIG. 4.

The first circuit board 311 may include a display driver 320 and a first connector 311a. The display driver 320 and the first connector 311a may be disposed on one surface of the first circuit board 311.

The first connector 311a may be connected to one end of the first connection cable 313 connected to the second circuit board 312. Thus, the display driver 320 mounted on the first circuit board 311 may be electrically connected to the second circuit board 312 through the first connection cable 313.

The second circuit board 312 may include a touch connector 312a, a first connection connector 312b, and a second connection connector 312c. The first connection connector 312b and the second connection connector 312c may be disposed on one surface of the second circuit board 312, and the touch connector 312a may be disposed on the other surface of the second circuit board 312.

The touch connector 312a may be connected to a touch connection portion provided at one end of the touch circuit board 210. Thus, the touch driver 220 may be electrically connected to the second circuit board 312.

The first connection connector 312b may be connected to the other end of the first connection cable 313 connected to the first circuit board 311. Thus, the display driver 320 mounted on the first circuit board 311 may be electrically connected to the second circuit board 312 through the first connection cable 313.

The second connection connector 312c may be connected to one end of a second connection cable 314 connected to the main connector 730 of the main circuit board 700. Thus, the second circuit board 312 may be electrically connected to the main circuit board 700 through the second connection cable 314.

A connector connection portion 315 may be formed at the other end of the second connection cable 314. As shown in FIG. 4, the connector connection portion 315 of the second connection cable 314 may pass through the second through-hole CAH2 of the middle frame 600 to extend to the lower portion of the middle frame 600. Further, as shown in FIG. 5, the connector connection portion 315 of the second connection cable 314, having passed through the second through-hole CAH2, may pass through the gap between the middle frame 600 and the main circuit board 700 to extend to the lower portion of the main circuit board 700. Finally, as shown in FIG. 5, the connector connection portion 315 of the second connection cable 314 may be connected to the main connector 730 disposed on the lower surface of the main circuit board 700.

According to the exemplary embodiment shown in FIGS. 3, 4, and 5, the sound circuit board 530 connected to the sound generator 510 may be connected to the sound connector 740 of the main circuit board 700 through the first through-hole CAH1 of the middle frame 600. Therefore, the sound generator 510 may be stably connected to the first sound driver 760 and second sound driver 770 of the main circuit board.

Further, according to the exemplary embodiment shown in FIGS. 3, 4, and 5, the second connection cable 314 connected to the display circuit board 310 may extend to the lower portion of the middle frame 600 through the second through-hole CAH2 of the middle frame 600 to be connected to the main connector 730 of the main circuit board 700. Therefore, the display circuit board 310 may be stably connected to the main circuit board 700.

FIG. 6 is a cross-sectional view of the display device 10 taken along a sectional line I-I' of FIGS. 3, 4, and 5.

Since the cover window 100, the touch sensing unit 200, the display panel 300, the panel lower member 400, the first adhesive member 910, the second adhesive member 920, and the third adhesive member 930, shown in FIG. 6, have been described in detail with reference to FIGS. 1 and 2, details thereof will not be described.

Referring to FIG. 6, the sound generator 510 is disposed under the panel lower member 400. The sound generator 510 may be attached to the lower surface of the panel lower member 400 through the fourth adhesive member 940. The fourth adhesive member 940 may be a pressure sensitive adhesive (PSA) member.

The first pad electrodes 510a of the sound generator 510 may be disposed to protrude from at least one side of the sound generator 510. The first pad electrodes 510a of the sound generator 510 may be connected to one end of the sound circuit board 530. FIG. 6 illustrates that the upper surface of one end of the sound circuit board 530 is connected to the lower surface of the first pad electrode 510a, but the exemplary embodiments are not limited thereto. For example, the lower surface of the sound circuit board 530 may be connected to the upper surface of the first pad electrode 510a. The other end of the sound circuit board 530 may be connected to the sound connector 740 disposed on the upper surface of the main circuit board 700 through the first through-hole CAH1 penetrating the middle frame 600.

The sound generator 510 may be disposed in the accommodation hole AH penetrating the middle frame 600. When the height of the sound generator 510 is not high, the middle frame 600 may be provided with an accommodation groove instead of the accommodation hole AH.

Figure 7:
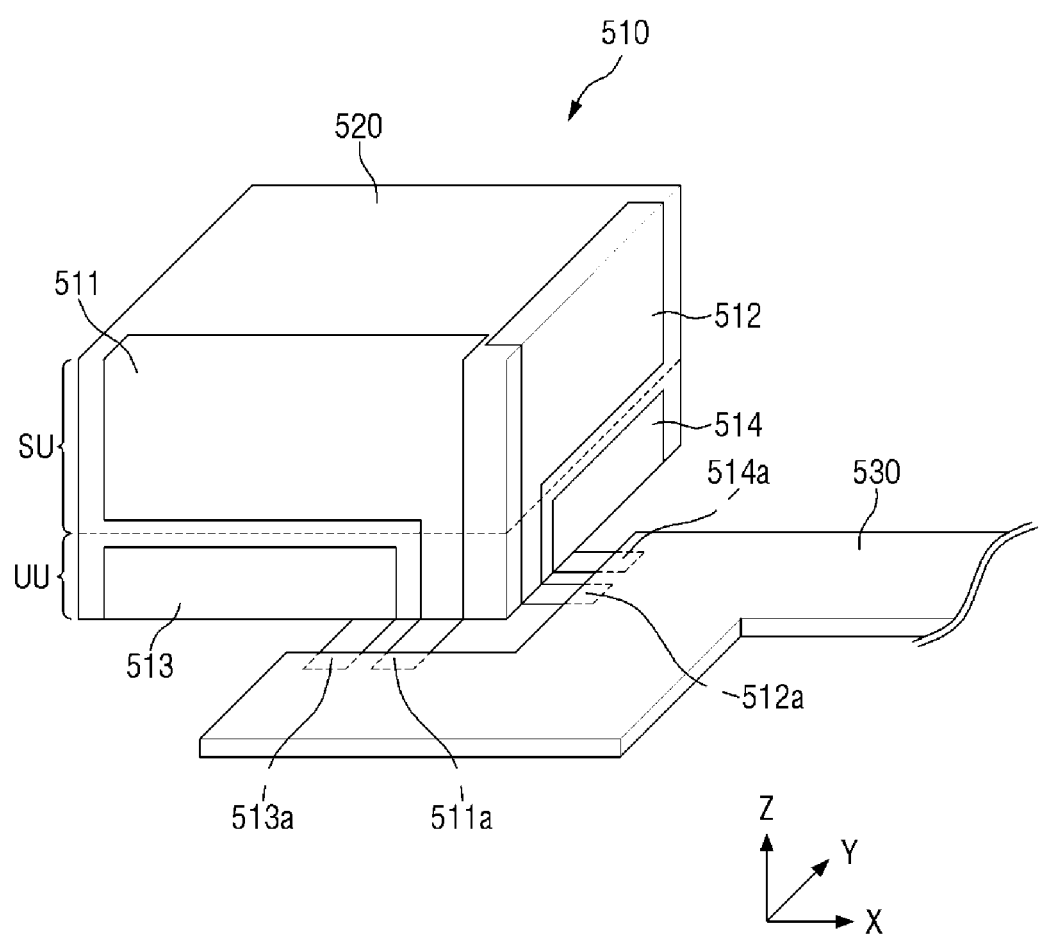
FIG. 7 is a perspective view showing an example of the sound generator of FIG. 6.
Figure 8:
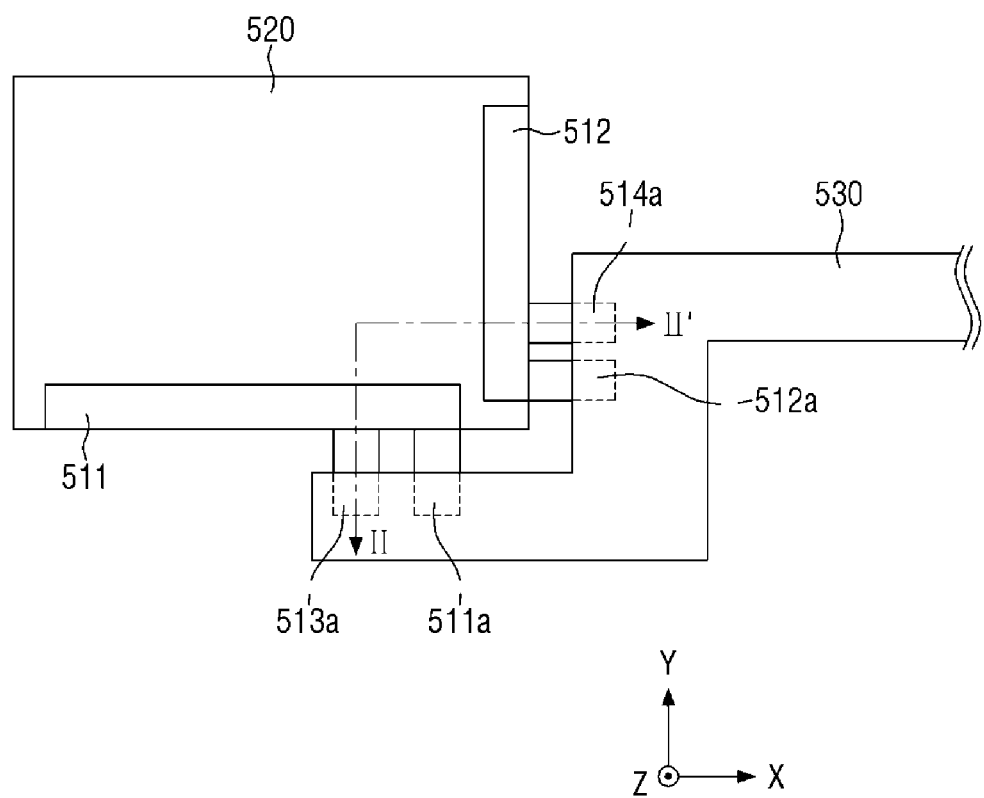
FIG. 8 is a plan view showing an example of the sound generator of FIG. 6.
Figure 9:
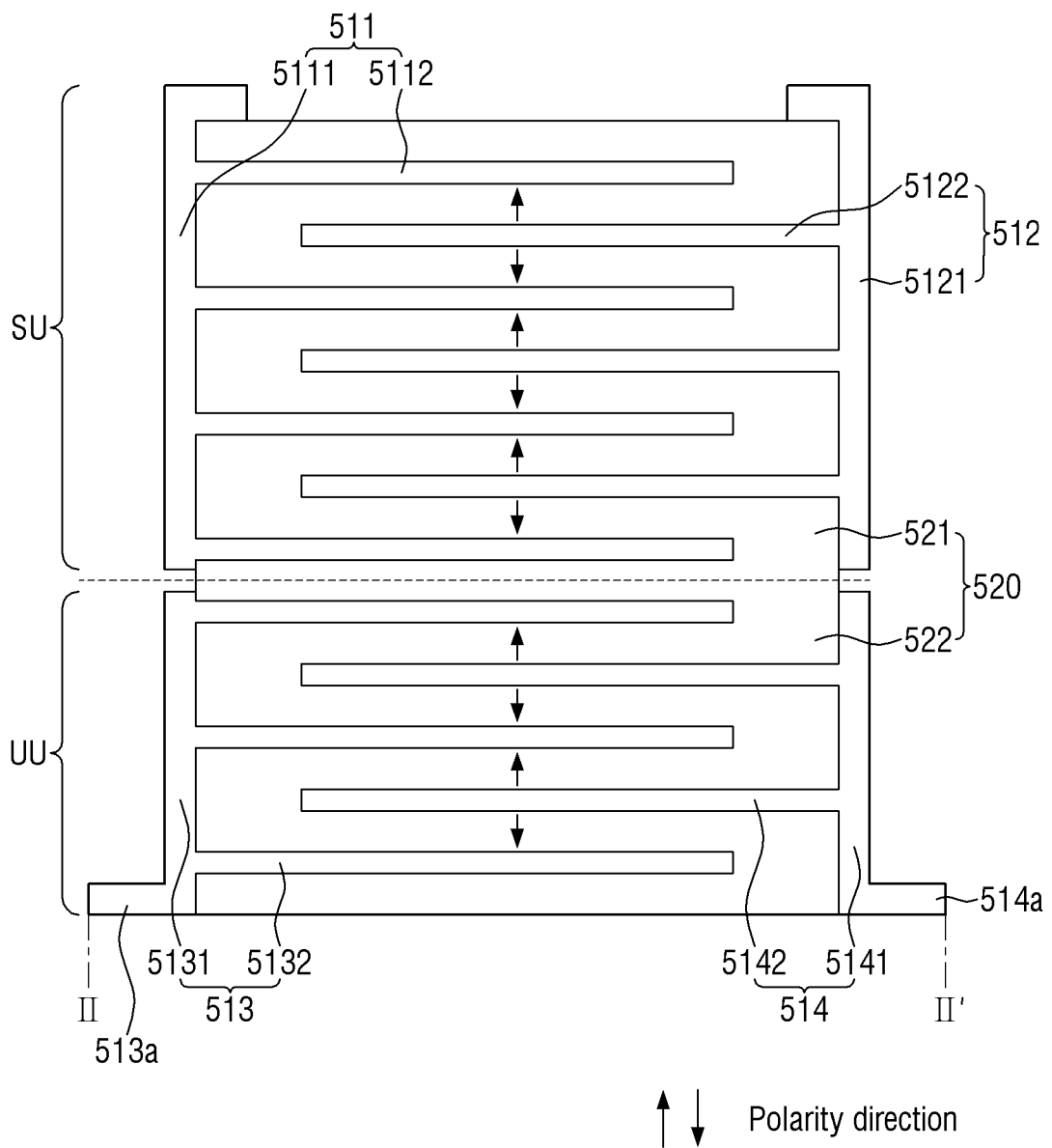
FIG. 9 is a cross-sectional view taken along a sectional line II-II' of FIG. 8.

FIG. 7 is a perspective view showing an example of the sound generator of FIG. 6. FIG. 8 is a plan view showing an example of the sound generator of FIG. 6. FIG. 9 is a cross-sectional view taken along a sectional line II-II' of FIG. 8.

Hereinafter, the sound generator 510 will be described in detail with reference to FIGS. 7, 8, and 9.

Referring to FIGS. 7, 8, and 9, the sound generator 510 may include a sound output unit SU for vibrating the display panel 300 to generate a sound or an audible sound, and an ultrasonic wave output unit UU for vibrating the display panel 300 to generate an ultrasonic wave.

FIGS. 7, 8, and 9 illustrate that the sound output unit SU is disposed on the sound generator 510 and the ultrasonic wave output unit UU is disposed under the sound generator 510, but the exemplary embodiments are not limited thereto. For example, the sound output unit SU may be disposed under the sound generator 510, and the ultrasonic output unit UU may be disposed at the center of the sound generator 510. Further, the sound output units SU may be disposed on and under the sound generator 510, respectively, and the ultrasonic wave output unit UU may be disposed between the sound output units SU. That is, the ultrasonic output unit UU may be disposed at the center of the sound generator 510. In FIGS. 7, 8, and 9, the sound output unit SU and the ultrasonic wave output unit UU may be disposed in a line in the vertical direction (Z-axis direction). The vertical direction (Z-axis direction) may be a height direction of the sound generator 510 (or vibration layer 520).

The sound output unit SU may include a first electrode 511, a second electrode 512, and a first sub-vibration layer 521 of the vibration layer 520. The ultrasonic wave output unit UU may include a third electrode 513, a fourth electrode 514, and a second sub-vibration layer 522 of the vibration layer 520.

The first electrode 511 may include a first stem electrode 5111 and first branch electrodes 5112. FIG. 7 illustrates that the first stem electrode 5111 is disposed on one side surface of the vibration layer 520, but the exemplary embodiments are not limited thereto. For example, the first stem electrode 5111 may be disposed on a plurality of side surfaces of the vibration layer 520. The first stem electrode 5111 may be disposed on the upper surface of the vibration layer 520. The first branch electrodes 5112 may be branched from the first stem electrode 5111. The first branched electrodes 5112 may be arranged in parallel with each other.

The second electrode 512 may include a second stem electrode 5121 and second branch electrodes 5122. FIG. 7 illustrates that the second stem electrode 5121 is disposed on the other side surface of the vibration layer 520, but the exemplary embodiments are not limited thereto. For example, the second stem electrode 5121 may be disposed on a plurality of side surfaces of the vibration layer 520 not provided with the first stem electrode 5111. The second stem electrode 5121 may be disposed on the upper surface of the vibration layer 520. The second branch electrodes 5122 may be branched from the second stem electrode 5121. The second branch electrodes 5122 may be arranged in parallel with each other.

The first branch electrodes 5112 and the second branch electrodes 5122 may be arranged in parallel to each other in the horizontal direction (X-axis direction or Y-axis direction). Further, the first branched electrodes 5112 and the second branched electrodes 5122 may be alternately arranged in the vertical direction (Z-axis direction). That is, the first branch electrodes 5112 and the second branch electrodes 5122 may be arranged repeatedly in the vertical direction (Z-axis direction) in order of the first branch electrode 5112, the second branch electrode 5122, the first branch electrode 5112, and the second branch electrode 5122. The horizontal direction (X-axis direction or Y-axis direction) may be a first width direction or second width direction of the vibration layer 520, and the vertical direction (Z-axis direction) may be a height direction of the vibration layer 520.

The third electrode 513 may include a third stem electrode 5131 and third branch electrodes 5132. FIG. 7 illustrates that the third stem electrode 5131 is disposed on one side surface of the vibration layer 520, but the exemplary embodiments are not limited thereto. For example, the third stem electrode 5131 may be disposed on a plurality of side surfaces of the vibration layer 520. The third stem electrode 5131 may be disposed on the upper surface of the vibration layer 520 provided with the fist stem electrode 5111. The third branch electrodes 5132 may be branched from the third stem electrode 5131. The third branch electrodes 5132 may be arranged in parallel with each other.

The fourth electrode 514 may include a fourth stem electrode 5141 and fourth branch electrodes 5142. FIG. 7 illustrates that the fourth stem electrode 5141 is disposed on the other side surface of the vibration layer 520, but the exemplary embodiments are not limited thereto. For example, the fourth stem electrode 5141 may be disposed on a plurality of side surfaces of the vibration layer 520 not provided with the third stem electrode 5131. The fourth stem electrode 5141 may be disposed on the side surface of the vibration layer 520 provided with the second stem electrode 5121. The fourth branch electrodes 5142 may be branched from the fourth stem electrode 5141. The fourth branch electrodes 5142 may be arranged in parallel with each other.

The third branch electrodes 5132 and the fourth branch electrodes 5142 may be arranged in parallel to each other in the horizontal direction (X-axis direction or Y-axis direction). Further, the third branch electrodes 5132 and the fourth branch electrodes 5142 may be alternately arranged in the vertical direction (Z-axis direction). That is, the third branch electrodes 5132 and the fourth branch electrodes 5142 may be arranged repeatedly in the vertical direction (Z-axis direction) in order of the third branch electrode 5132, the fourth branch electrode 5142, the third branch electrode 5132, and the fourth branch electrode 5142.

The first electrode 511, the second electrode 512, the third electrode 513, and the fourth electrode 514 are made of silver (Ag) or an alloy of silver (Ag) and palladium (Pd) having a high melting point because the manufacturing temperature of the vibration layer 520 is high. When the first electrode 511 and the second electrode 512 are made of an alloy of silver (Ag) and palladium (Pd), the content of silver (Ag) may be higher than the content of palladium (Pd).

The first pad electrode 511a may be connected to the first electrode 511. The first pad electrode 511a may protrude outward from the first stem electrode 5111 disposed on one side surface of the vibration layer 520.

The second pad electrode 512a may be connected to the second electrode 512. The second pad electrode 512a may protrude outward from the second stem electrode 5121 disposed on the other side surface of the vibration layer 520.

The third pad electrode 513a may be connected to the third electrode 513. The third pad electrode 513a may protrude outward from the third stem electrode 5131 disposed on one side surface of the vibration layer 520.

The fourth pad electrode 514a may be connected to the fourth electrode 514. The fourth pad electrode 514a may protrude outward from the fourth stem electrode 5141 disposed on the other side surface of the vibration layer 520.

The first pad electrode 511a, the second pad electrode 512a, the third pad electrode 513a, and the fourth pad electrode 514a may be connected to the lead lines or pad electrodes of the sound circuit board 530. The lead lines or pad electrodes of the sound circuit board 530 may be disposed on the lower surface of the sound circuit board 530.

As shown in FIG. 7, when the first pad electrode 511a and the third pad electrode 513a protrude from one side of the vibration layer 520, and the second pad electrode 512a and the fourth pad electrode 514a protrude from the other side of the vibration layer 520, the sound circuit board 530 may be disposed on one side and the other side of the sound generator 510, but is the exemplary embodiments are not limited thereto. The first pad electrode 511a, the second pad electrode 512a, the third pad electrode 513a, and the fourth pad electrode 514a may protrude from one side of the vibration layer 520. In this case, the sound circuit board 530 may be disposed on one side surface of the sound generating device 510.

The vibration layer 520 may be a piezoelectric actuator deformed in accordance with a first driving voltage applied to the first electrode 511, a second driving voltage applied to the second electrode 512, a third driving voltage applied to the third electrode 513, and a fourth driving voltage applied to the fourth electrode 514. In this case, the vibration layer 520 may be made of any one of a piezoelectric material such as poly vinylidene fluoride (PVDF) or plumbum zirconate titanate (PZT), and an electroactive polymer.

The vibration layer 520 may include a first sub-vibration layer 521 and a second sub-vibration layer 522. The first sub-vibration layer 521 refers to a region of the vibration layer 520 corresponding to the sound output unit SU, and the second sub-vibration layer 522 refers to a region of the vibration layer 520 corresponding to the ultrasonic wave output unit UU.

The vibration layer 520 may be disposed between the first branch electrodes 5112 and the second branch electrodes 5122 in the first sub-vibration layer 521. The vibration layer 520 shrinks or expands according to the difference between the first driving voltage applied to the first branch electrodes 5112 and the second driving voltage applied to the second branch electrodes 5122 in the first sub-vibration layer 521. The vibration layer 520 may be disposed between the third branch electrodes 5132 and the fourth branch electrodes 5142 in the second sub-vibration layer 522. The vibration layer 520 shrinks or expands according to the difference between the third driving voltage applied to the third branch electrodes 5132 and the fourth driving voltage applied to the fourth branch electrodes 5142 in the second sub-vibration layer 522.

Since the volume of a sound of the sound output unit SU is proportional to the area of the sound output unit SU, considering the volume of the sound of the sound output unit SU, the area of the first sub-vibration layer 521 may be larger than the area of the second sub-vibration layer 522. The number of the first branch electrodes 5112 or the number of the second branch electrodes 5122 may be greater than the number of the third branch electrodes 5132 or the number of the fourth branch electrodes 5142.

Hereinafter, a method of vibrating the first sub-vibration layer 521 of the vibration layer 520 according to the principles of the invention will be described in detail with reference to FIGS. 9, 10A, and 10B. Since a method of vibrating the second sub-vibration layer 522 of the vibration layer 520 is substantially the same as the method of vibrating the first sub-vibration layer 521 of the vibration layer 520, details thereof will not be described.

Specifically, as shown in FIG. 9, the polarity direction of the vibration layer 520 disposed between the first branch electrode 5112 and the second branch electrode 5122 disposed under the first branch electrode 5112 may be an upward direction (illustrated by an arrow ↑). In this case, the vibration layer 520 has positive polarity in the upper region adjacent to the first branch electrode 5112, and has negative polarity in the lower region adjacent to the second branch electrode 5122. Further, the polarity direction of the vibration layer 520 disposed between the second branch electrode 5122 and the first branch electrode 5112 disposed under the second branch electrode 5122 may be a downward direction (illustrated by an arrow ↓). In this case, the vibration layer 520 has negative polarity in the upper region adjacent to the second branch electrode 5122, and has positive polarity in the lower region adjacent to the first branch electrode 5112. The polarity direction of the vibration layer 520 may be determined by applying an electric field to the vibration layer 520 using the first branched electrode 5112 and the second branched electrode 5122.

Figure 10A:
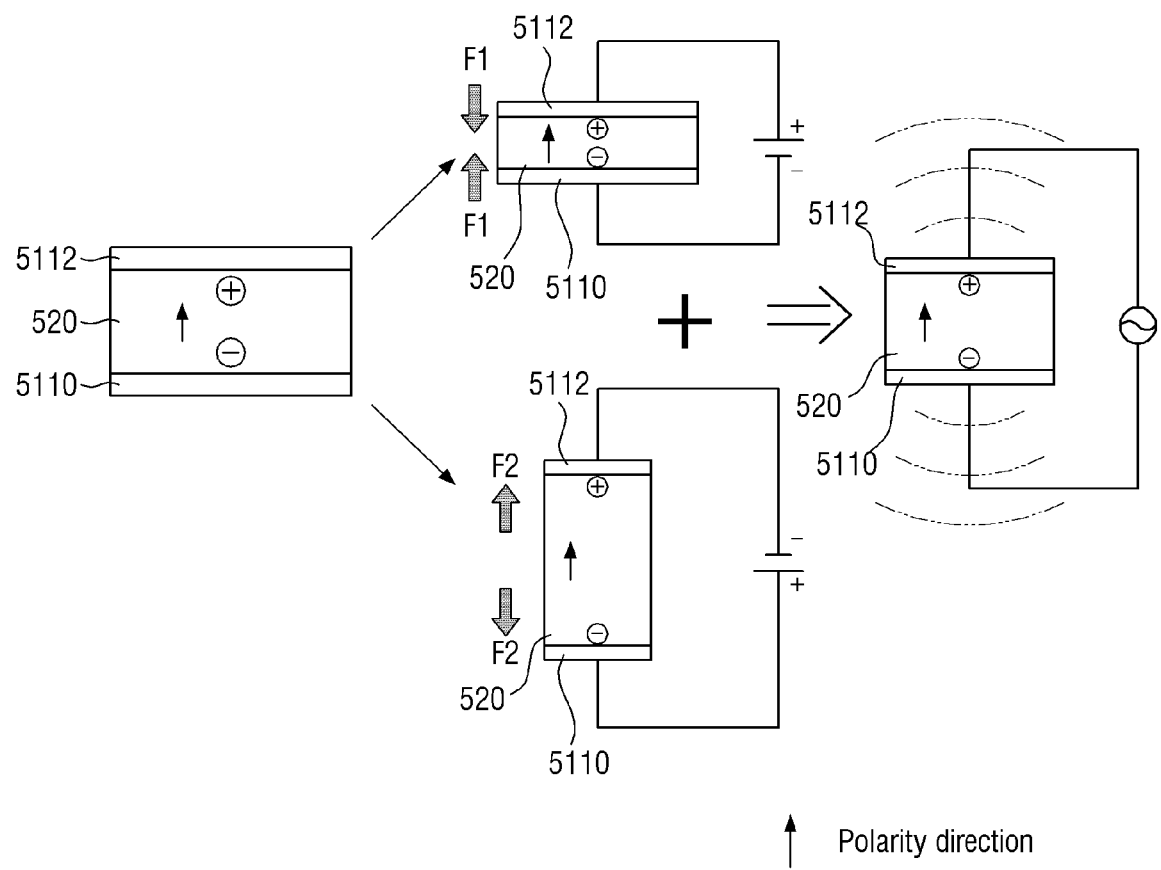
FIG. 10A is an exemplary diagram showing a method of vibrating a vibration layer disposed between a first branch electrode and a second branch electrode of a sound generator according to the principles of the invention.

As shown in FIG. 10A, in the case where the polarity direction of the vibration layer 520 disposed between the first branch electrode 5112 and the second branch electrode 5122 disposed under the first branch electrode 5112 is the upward direction (↑), when a first driving voltage having positive polarity is applied to the first branch electrode 5112, and a second driving voltage having negative polarity is applied to the second branch electrode 5122, the vibration layer 520 may be contracted by a first force F1. The first force F1 may be a contraction force. Further, when a first driving voltage having negative polarity is applied to the first branch electrode 5112, and a second driving voltage having positive polarity is applied to the second branch electrode 5122, the vibration layer 520 may be expanded by a second force F2. The second force F2 may be an expansion force.

In the case where the polarity direction of the vibration layer 520 disposed between the second branch electrode 5122 and the first branch electrode 5112 disposed under the second branch electrode 5122 may be a downward direction (↓), when a first driving voltage having positive polarity is applied to the second branch electrode 5122, and a second driving voltage having negative polarity is applied to the first branch electrode 5112, the vibration layer 520 may be expanded by the expansion force. The first force F1 may be the contraction force. When a first driving voltage having negative polarity is applied to the second branch electrode 5122, and a second driving voltage having positive polarity is applied to the first branch electrode 5112, the vibration layer 520 may be contracted by the contraction force. The second force F2 may be the expansion force.

According to the exemplary embodiment shown in FIG. 9, when the first driving voltage applied to the first electrode 511 and the second driving voltage applied to the second electrode 512 are alternately repeated in positive polarity and negative polarity, the vibration layer 520 repeats shrinkage and expansion. Thus, the sound generator 510 vibrates.

Figure 10B:
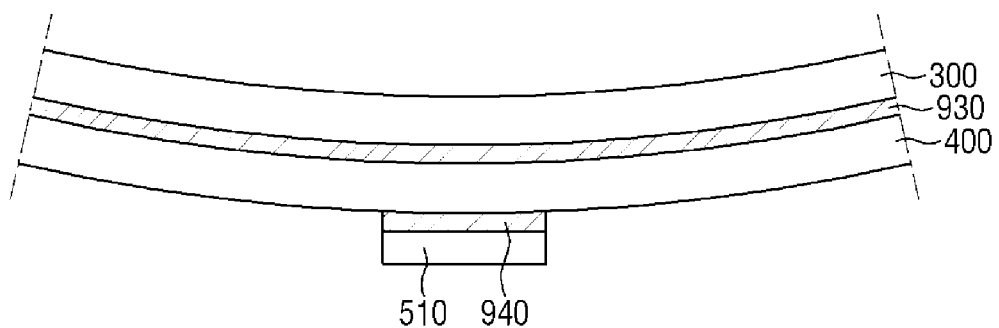
FIGS. 10B and 10C are exemplary views showing a method of vibrating a display panel by using the vibration of the sound generator according to the principles of the invention.
Figure 10C:
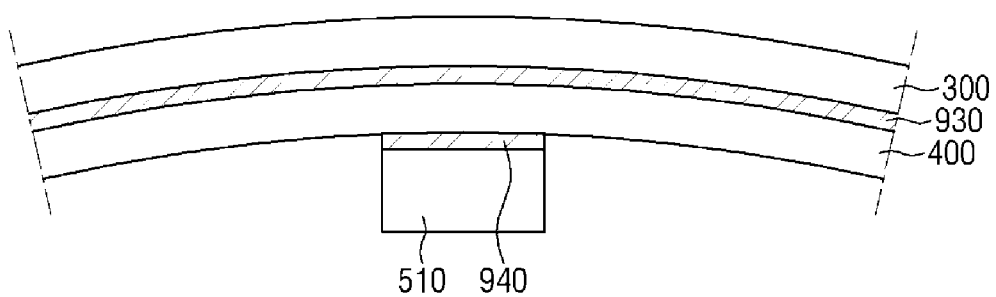

Further, since the sound generator 510 is disposed under the display panel 300, the display panel 300 is vibrated downward and upward by stress as shown in FIGS. 10B and 10C when the vibration layer 520 of the sound generator 510 contracts and expands. Like this, since the display panel 300 may be vibrated by the sound generator 510, the display device 10 may generate sounds or ultrasonic waves.

Meanwhile, the volume of a sound of the sound output unit SU is proportional to the area of the sound output unit SU. Therefore, considering the volume of a sound of the sound output unit SU, the area of the sound output unit SU may be larger than the area of the ultrasonic wave output unit UU.

Further, the first electrode 511 and the second electrode 512 of the sound output unit SU are connected to the first sound driver 760 through the sound circuit board 530, and receive the first driving voltage and the second driving voltage from the first sound driver 760. The third electrode 513 and the fourth electrode 514 of the ultrasonic wave output unit UU are connected to the second sound driver 770 through the sound circuit board 530, and receive the third driving voltage and the fourth driving voltage from the second sound driver 770.

The impedance of the sound output unit SU may be represented by Equation 1. The impedance of the third electrode 513 or the fourth electrode 514 of the ultrasonic wave output unit UU may also be represented by Equation 1.

$$X_C = \frac{1}{2\pi FC} \qquad \text{[Equation 1]}$$

In Equation 1, $X_C$ is impedance, F is frequency, and C is capacitance. According to Equation 1, the impedance $X_C$ is of the sound output unit SU is inversely proportional to the frequency F of the first driving voltage applied to the first electrode 511 or the second driving voltage applied to the second electrode 512 and the capacitance C of the first electrode 511 or the second electrode 512. The impedance $X_C$ is of the ultrasonic wave output unit UU is inversely proportional to the frequency F of the third driving voltage applied to the third electrode 513 or the fourth driving voltage applied to the fourth electrode 514 and the capacitance C of the third electrode 513 or the fourth electrode 514.

Since the area of the sound output unit SU is larger than the area of the ultrasonic wave output unit UU, the area of the first electrode 511 or the second electrode 512 of the sound output unit SU is larger than the area of the third electrode 513 or the fourth electrode 514 of the ultrasonic wave output unit UU. Since the capacitance is proportional to an area, the capacitance C of the first electrode 511 or the second electrode 512 of the sound output unit SU may be larger than the capacitance of the third electrode 513 or the fourth electrode 514 of the ultrasonic wave output unit UU. Therefore, the impedance $X_C$ of the sound output unit SU may be lower than the impedance $X_C$ of the ultrasonic wave output unit UU.

The impedance $X_C$ of the sound output unit SU should be set to be larger than the output impedance of the first sound driver 760. When the impedance $X_C$ of the sound output unit SU is lower than the output impedance of the first sound driver 760, impedance matching is required because an overcurrent flows from the first sound driver 760 to the sound output unit SU. For this purpose, the main circuit board 700 may include a first resistor connected to an output terminal of the first sound driver 760. The resistance of the first resistor may be designed in consideration of the impedance $X_C$ of the sound output unit SU and the output impedance of the first sound driver 760.

Further, the impedance $X_C$ of the ultrasonic wave output unit SU should be set to be larger than the output impedance of the second sound driver 770. When the impedance $X_C$ of the ultrasonic wave output unit SU is lower than the output impedance of the second sound driver 770, impedance matching is required because an overcurrent flows from the first sound driver 760 to the sound output unit SU. For this purpose, the main circuit board 700 may include a second resistor connected to an output terminal of the second sound driver 770. The resistance of the second resistor may be designed in consideration of the impedance $X_C$ of the ultrasonic wave output unit UU and the output impedance of the second sound driver 770.

Figure 12:
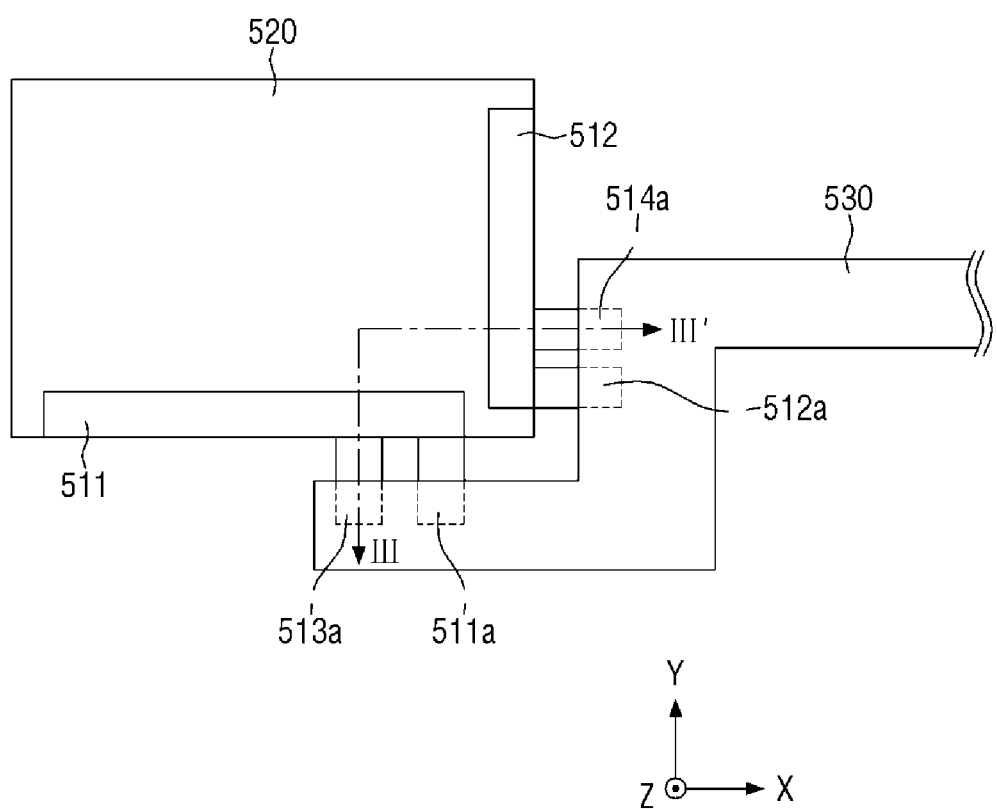
FIG. 12 is a plan view showing the sound generator of FIG. 6.
Figure 13:
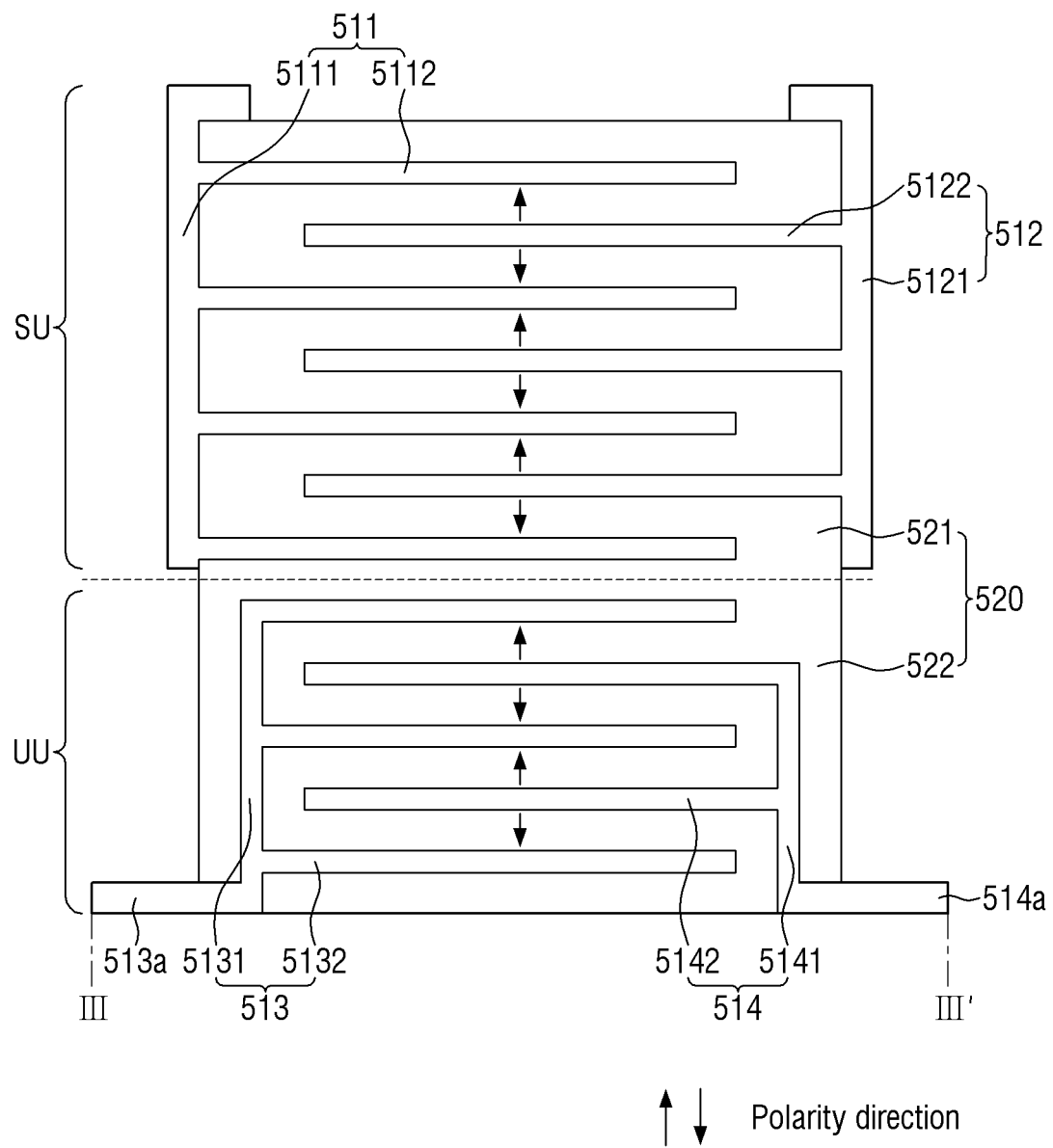
FIG. 13 is a cross-sectional view taken along a sectional line III-III' of FIG. 12.

FIG. 11 is a perspective view showing another example of the sound generator of FIG. 6. FIG. 12 is a plan view showing the sound generator of FIG. 7. FIG. 13 is a cross-sectional view taken along a sectional line III-III' of FIG. 12.

The exemplary embodiment shown in FIGS. 11, 12, and 13 is different from the exemplary embodiment shown in FIGS. 7, 8, and 9 in that the third stem electrode 5131 of the third electrode 513 of the ultrasonic wave output unit UU and the fourth stem electrode 5141 of the fourth electrode 514 are not disposed on the side surfaces of the vibration layer 520, the third stem electrode 5131 is disposed in the first contact hole CT1 formed by removing the vibration layer 520, and the fourth stem electrode 5141 is disposed in the second contact hole CT2 formed by removing the vibration layer 520. Therefore, in FIGS. 11, 12, and 13, a description overlapping the exemplary embodiment shown in FIGS. 7, 8, and 9 will be omitted.

Referring to FIGS. 11, 12, and 13, the vibration layer 520 may be provided with a first contact hole CH1 formed by removing a part of the second sub-vibration layer 522 of the vibration layer 520 and a second contact hole CH2 formed by removing another part of the second sub-vibration layer 522 of the vibration layer 520. The third stem electrode 5131 may be disposed in the first contact hole CH1, and the fourth stem electrode 5141 may be disposed in the second contact hole CH2.

The first contact hole CH1 and the second contact hole CH2 may be formed long in the vertical direction (Z-axis direction). Thus, the third stem electrode 5131 may be disposed in the vertical direction (Z-axis direction), and the third branch electrodes 5132 branched from the third stem electrode 5131 may be arranged in the horizontal direction (X axis direction or Y axis direction). Further, the fourth stem electrode 5141 may be disposed in the vertical direction (Z-axis direction), and the fourth branch electrodes 5142 branched from the fourth stem electrode 5141 may be arranged in the horizontal direction (X axis direction or Y axis direction). The horizontal direction (X-axis direction or Y-axis direction) may be a first width direction or second width direction of the vibration layer 520, and the vertical direction (Z-axis direction) may be a height direction of the vibration layer 520.

Since the vibration layer 520 cannot vibrate when the third electrode 513 and the fourth electrode 514 are connected, the third stem electrode 5131 may be disposed to bypass the fourth branch electrodes 5142, and the fourth stem electrode 5141 may be disposed to bypass the third branch electrodes 5132.

The first pad electrode 511a and the third pad electrode 513a may protrude outward from one side surface of the vibration layer 520 where the first stem electrode 5111 is disposed. The second pad electrode 512a and the fourth pad electrode 514a may protrude outward from the other side surface of the vibration layer 520 where the second stem electrode 5121 is disposed.

As shown in FIG. 11, when the first pad electrode 511a and the third pad electrode 513a protrude outward from one side surface of the vibration layer 520 and the second pad electrode 512a and the fourth pad electrode 514a protrude outward from the other side surface of the vibration layer 520, the sound circuit board 530 may be disposed on one side surface and the other side surface of the sound generator 510, but the exemplary embodiments are not limited thereto. For example, when the first pad electrode 511a protrudes from the first side surface of the vibration layer 520, the second pad electrode 512a protrudes from the second side surface of the vibration layer 520, and the third pad electrode 513a and the fourth pad electrode 514a protrude from the third side surface of the vibration layer 520, the sound circuit board 530 may be disposed on the first, second, and third side surfaces of the sound generator 510. Or, the first pad electrode 511a, the second pad electrode 512a, the third pad electrode 513a, and the fourth pad electrode 514a may protrude from different side surfaces of the vibration layer 520, and in this case, the sound circuit board 530 may be disposed on four side surfaces of the sound generator 510.

Figure 14:
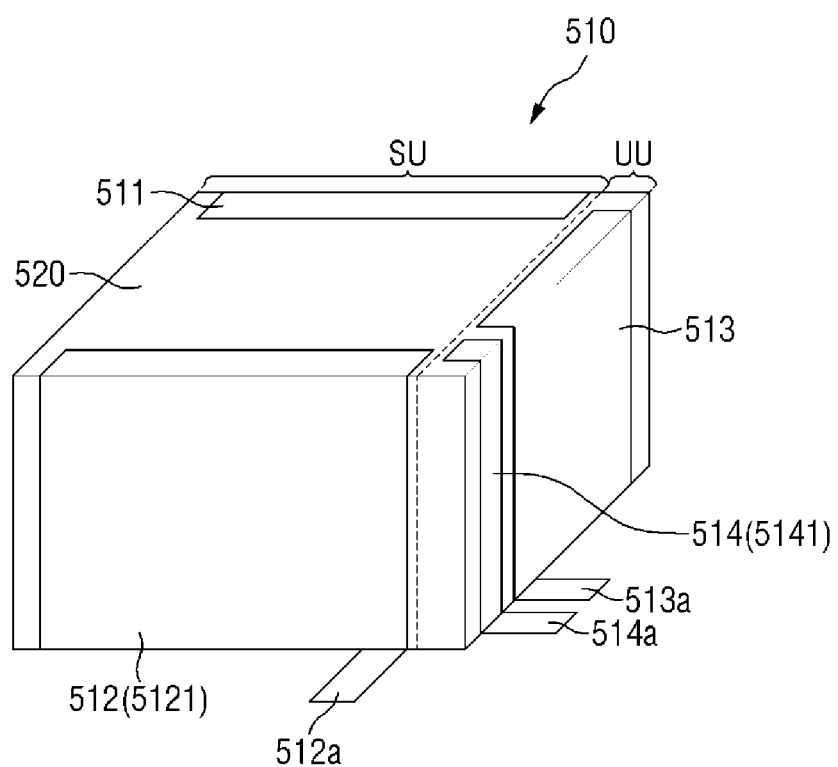
FIG. 14 is a perspective view showing another example of the sound generator of FIG. 6.
Figure 15:
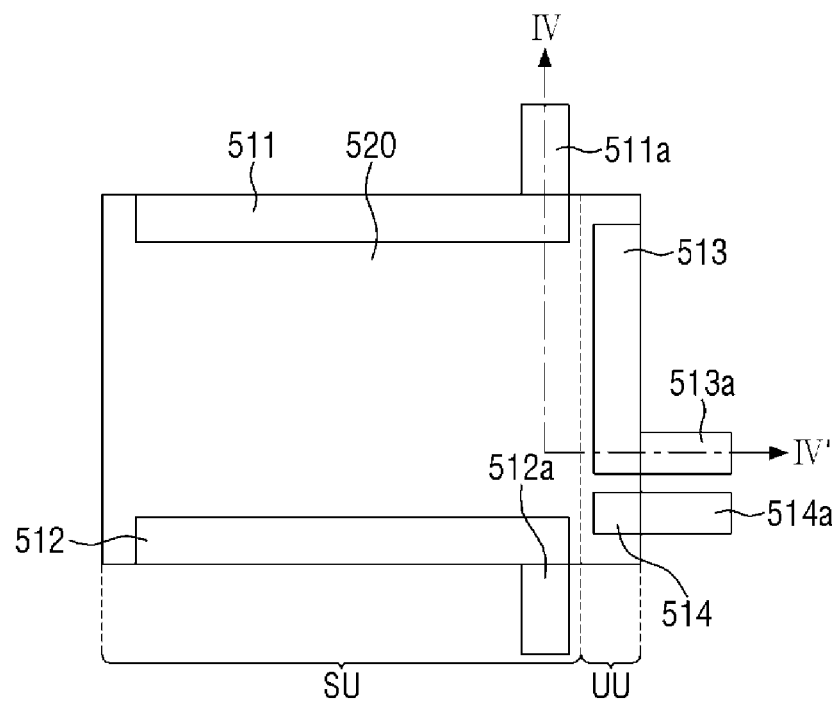
FIG. 15 is a plan view showing the sound generator of FIG. 6.
Figure 16:
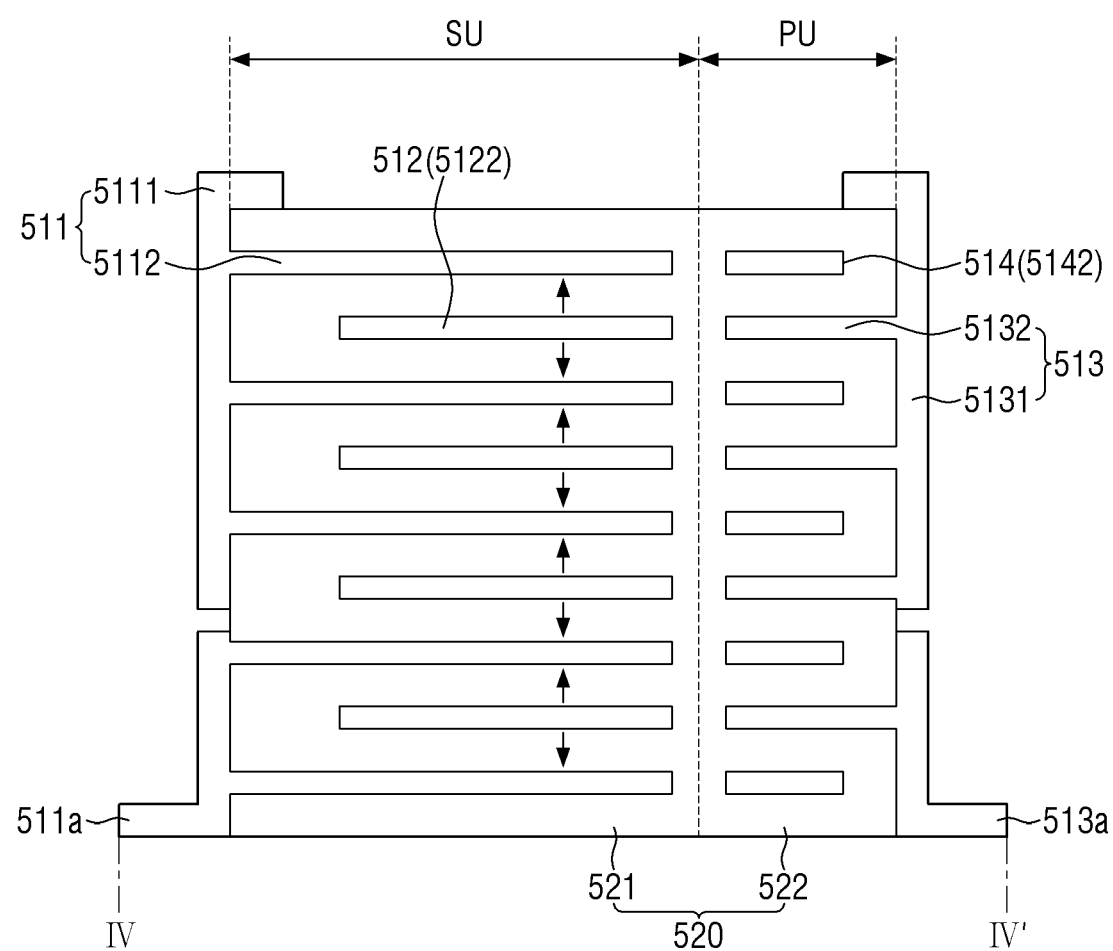
FIG. 16 is a cross-sectional view taken along a sectional line IV-IV' of FIG. 15.

FIG. 14 is a perspective view showing another example of the sound generator of FIG. 6. FIG. 15 is a plan view showing the sound generator of FIG. 6. FIG. 16 is a cross-sectional view taken along a sectional line IV-IV' of FIG. 15.

The exemplary embodiment shown in FIGS. 14, 15, and 16 is different from the exemplary embodiment shown in FIGS. 7, 8, and 9 in that the first stem electrode 5111 of the first electrode 511 of the sound output unit SU of the sound generator 510 and the second stem electrode 5121 of the second electrode 512 thereof are disposed on the respective side surfaces of the vibration layer 520 facing each other, and the third stem electrode 5131 of the third electrode 513 of the ultrasonic wave output unit UU and the fourth stem electrode 5141 of the fourth electrode 514 thereof are disposed on one side surface of the vibration layer 520. Therefore, in FIGS. 14, 15, and 16, a description overlapping the exemplary embodiment shown in FIGS. 7, 8, and 9 will be omitted.

FIGS. 14, 15, and 16 illustrate that the ultrasonic wave output unit UU is disposed on the first side surface of the sound generator 510 and the sound output unit SU is disposed on the second side surface of the sound generator 510, but the exemplary embodiments are not limited thereto. For example, the sound output units SU may be respectively disposed on the first side surface and second side surface of the sound generator 510, and the ultrasonic output unit UU may be disposed between the sound output units SU. In FIGS. 14, 15, and 16, the sound output unit SU and the ultrasonic wave output unit UU may be arranged in a line in the horizontal direction (X-axis direction or Y-axis direction). The horizontal direction (X-axis direction or Y-axis direction) may be the first width direction or the second width direction of the sound generator 510 (or the vibration layer 520).

Referring to FIGS. 14, 15, and 16, the first stem electrode 5111 of the first electrode 511 may be disposed on the first side surface of the vibration layer 520, and the second stem electrode 5121 of the second electrode 512 may be disposed on the second side facing the first side. The first stem electrode 5111 and the second stem electrode 5121 may also be disposed on the upper surface of the vibration layer 520. The first stem electrode 5111 and the second stem electrode 5121 may be disposed on the first sub-vibration layer 521 of the vibration layer 520.

The third stem electrode 5131 of the third electrode 513 and the fourth stem electrode 5141 of the fourth electrode 514 may be disposed on the third side surface of the vibration layer 520. The third stem electrode 5131 and the fourth stem electrode 5141 may also be disposed on the upper surface of the vibration layer 520. The third stem electrode 5131 and the fourth stem electrode 5141 may be disposed on the second sub-vibration layer 522 of the vibration layer 520.

FIGS. 14, 15, and 16 illustrate that the area of the third stem electrode 5131 disposed on the third side surface of the vibration layer 520 is larger than the area of the fourth stem electrode 5141, but the exemplary embodiments are not limited thereto. The area of the third stem electrode 5131 disposed on the third side surface of the vibration layer 520 may be substantially the same as the area of the fourth stem electrode 5141. Or, the area of the third stem electrode 5131 disposed on the third side of the vibration layer 520 may be smaller than the area of the fourth stem electrode 5141.

The first pad electrode 511a may protrude outward from the first side surface of the vibration layer 520 where the first stem electrode 5111 is disposed. The second pad electrode 512a may protrude outward from the second side surface of the vibration layer 520 where the second stem electrode 5121 is disposed. The third pad electrode 513a and the fourth pad electrode 514a may protrude outward from the third side surface of the vibration layer 520 where the third stem electrode 5131 and the fourth stem electrode 5141 are disposed. As shown in FIG. 11, when the first pad electrode 511a protrudes outward from the first side surface of the vibration layer 520, the second pad electrode 512a protrudes outward from the second side surface of the vibration layer 520, the third pad electrode 513a and the fourth pad electrode 514a protrude outward from the third side surface of the vibration layer 520, the sound circuit board 530 may be disposed on the first side surface, second side surface, and third side surface of the sound generator 510.

Figure 17:
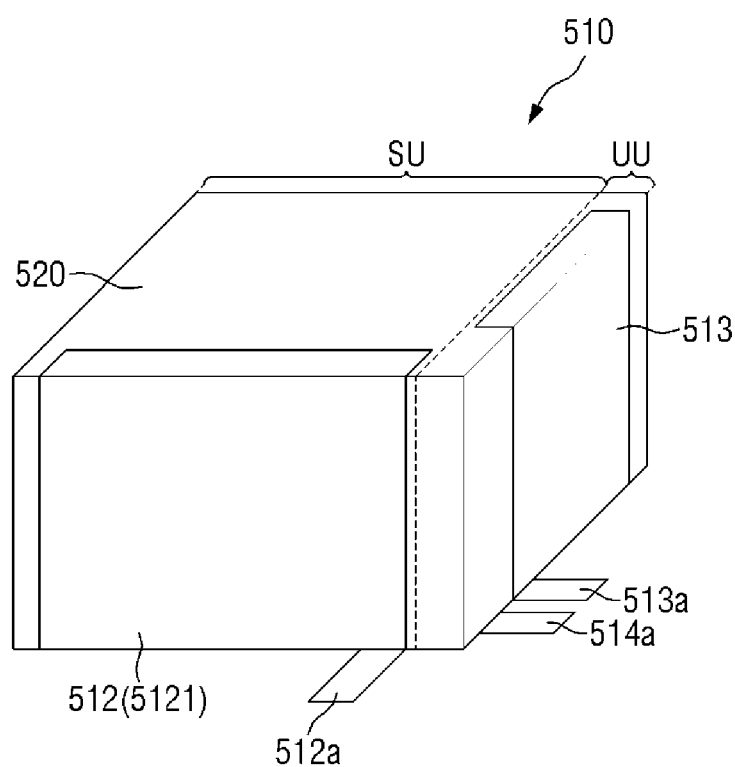
FIG. 17 is a perspective view showing another example of the sound generator of FIG. 6.
Figure 18:
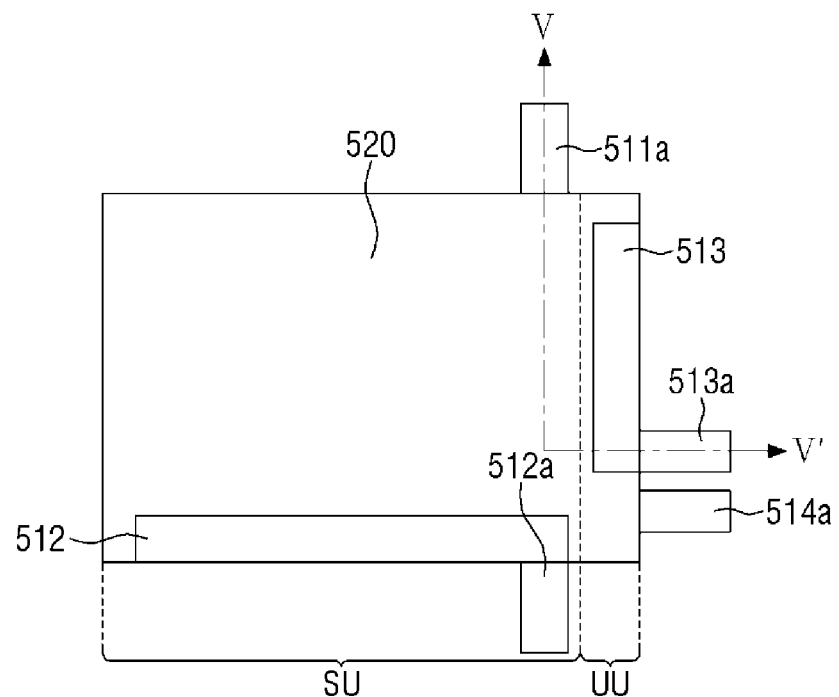
FIG. 18 is a plan view showing the sound generator of FIG. 6.
Figure 19:
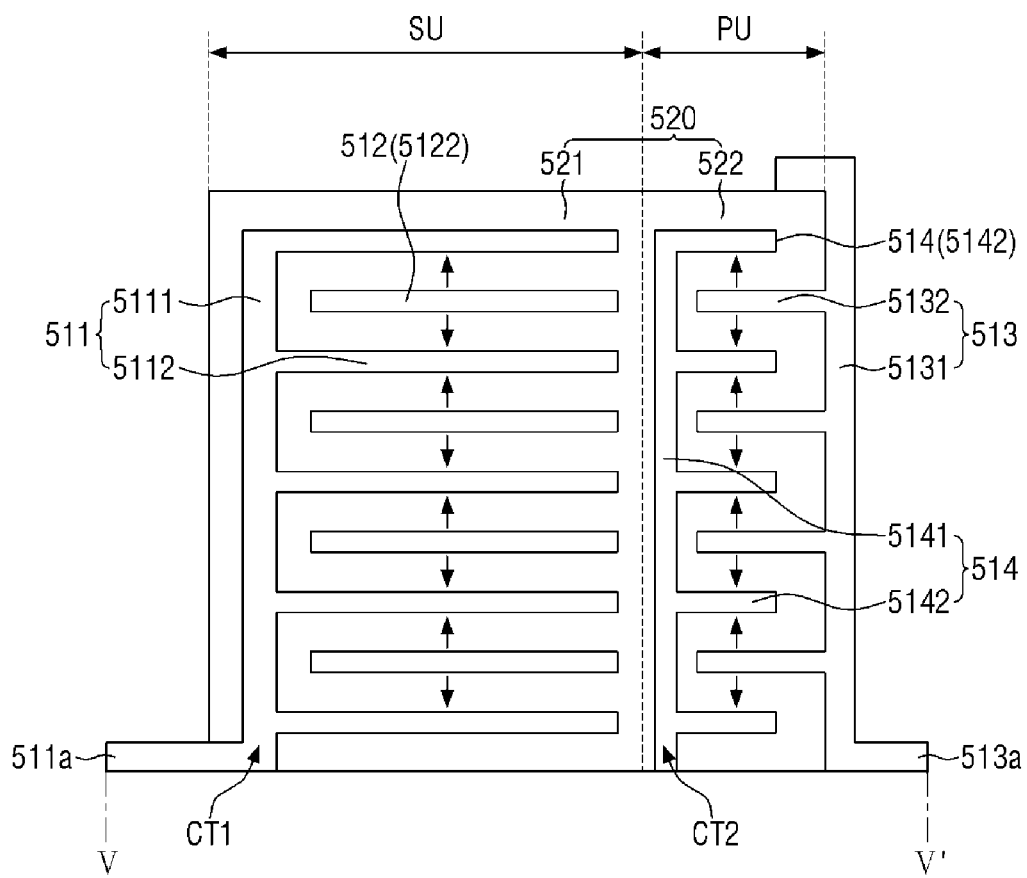
FIG. 19 is a cross-sectional view taken along a sectional line V-V of FIG. 18.

FIG. 17 is a perspective view showing another example of the sound generator of FIG. 6. FIG. 18 is a plan view showing the sound generator of FIG. 6. FIG. 19 is a cross-sectional view taken along a sectional line V-V of FIG. 18.

The exemplary embodiment shown in FIGS. 17, 18, and 19 is different from the exemplary embodiment shown in FIGS. 14, 15, and 16 in that the first stem electrode 5111 of the first electrode 511 of the sound output unit SU and the fourth stem electrode 5141 of the fourth electrode 514 of the ultrasonic wave output unit UU are not disposed on the side surfaces of the vibration layer 520, the first stem electrode 5111 is disposed in the first contact hole CT1 formed by removing the vibration layer 520, and the fourth stem electrode 5141 is disposed in the second contact hole CT2 formed by removing the vibration layer 520. Therefore, in FIGS. 17, 18, and 19, a description overlapping the exemplary embodiment shown in FIGS. 14, 15, and 16 will be omitted.

Referring to FIGS. 17, 18, and 19, the vibration layer 520 may be provided with a first contact hole CH1 formed by removing a part of the first sub-vibration layer 521 of the vibration layer 520 and a second contact hole CH2 formed by removing a part of the second sub-vibration layer 522 of the vibration layer 520. The first stem electrode 5111 may be disposed in the first contact hole CH1, and the fourth stem electrode 5141 may be disposed in the second contact hole CH2.

The first contact hole CH1 and the second contact hole CH2 may be formed long in the vertical direction (Z-axis direction). Thus, the first stem electrode 5111 may be disposed in the vertical direction (Z-axis direction), and the first branch electrodes 5112 branched from the first stem electrode 5111 may be arranged in the horizontal direction (X axis direction or Y axis direction). Further, the fourth stem electrode 5141 may be disposed in the vertical direction (Z-axis direction), and the fourth branch electrodes 5142 branched from the fourth stem electrode 5141 may be arranged in the horizontal direction (X axis direction or Y axis direction). The horizontal direction (X-axis direction or Y-axis direction) may be a first width direction or second width direction of the vibration layer 520, and the vertical direction (Z-axis direction) may be a height direction of the vibration layer 520.

Since the vibration layer 520 cannot vibrate when the first electrode 511 and the second electrode 512 are connected, the first stem electrode 5111 may be disposed to bypass the second branch electrodes 5122. Further, since the vibration layer 520 cannot vibrate when the third electrode 513 and the fourth electrode 514 are connected, the fourth stem electrode 5141 may be disposed to bypass the third branch electrodes 5132.

The first pad electrode 511a and the third pad electrode 513a may protrude outward from one side surface of the vibration layer 520 where the first stem electrode 5111 is disposed. The second pad electrode 512a and the fourth pad electrode 514a may protrude outward from the other side surface of the vibration layer 520 where the second stem electrode 5121 is disposed.

FIGS. 17, 18, and 19 illustrate that the first stem electrode 5111 is disposed in the first contact hole CT1 and the fourth stem electrode 5141 is disposed in the second contact hole CT2, but the exemplary embodiments are not limited thereto. That is, any one of the first stem electrode 5111 and the second stem electrode 5121 disposed in the sound output unit SU may be disposed in the first contact hole CT1, and any one of the third stem electrode 5131 and the fourth stem electrode 5141 disposed in the ultrasonic wave output unit UU may be disposed in the second contact hole CT2.

Figure 20:
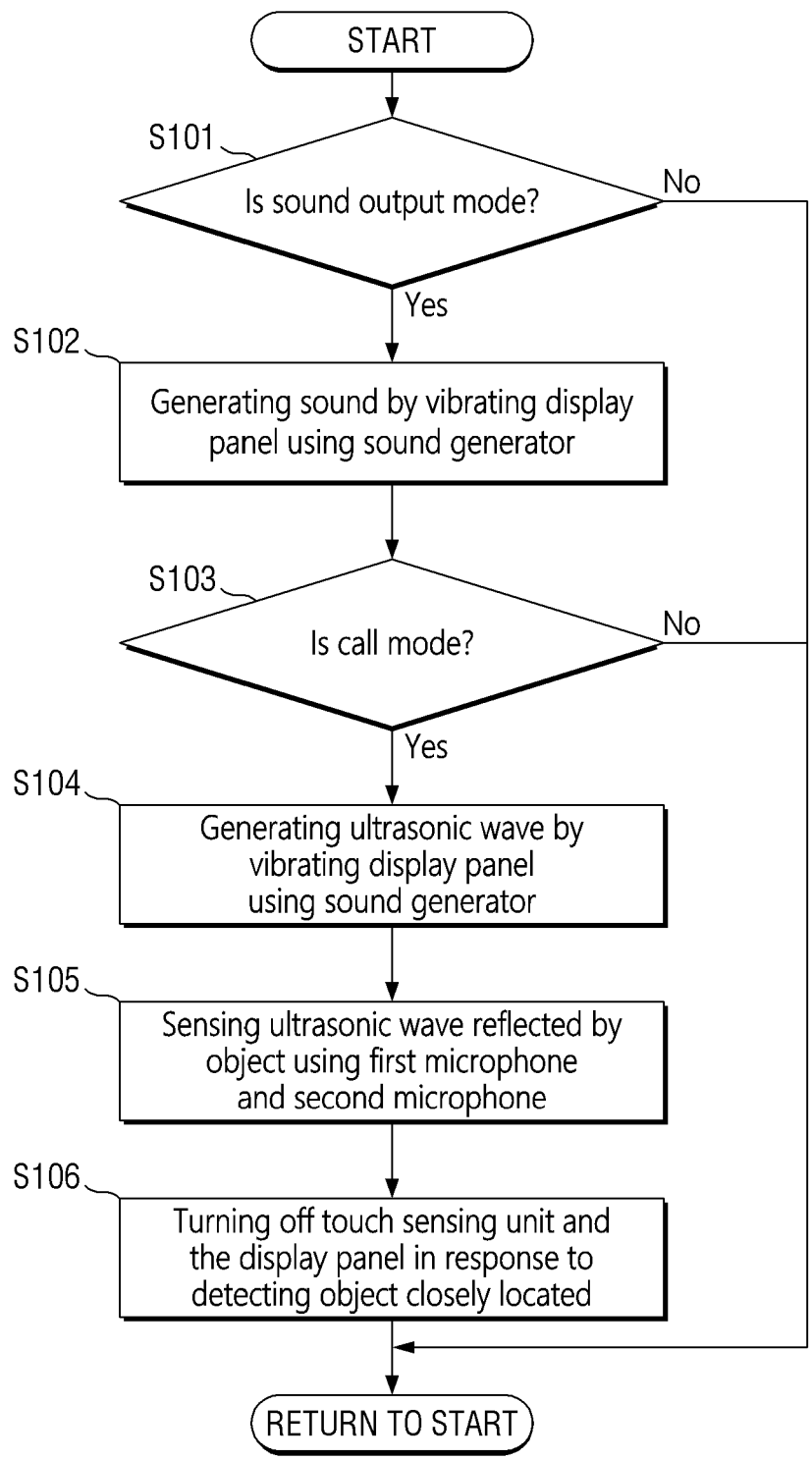
FIG. 20 is a flowchart showing a method of driving a display device constructed according to an exemplary embodiment.

FIG. 20 is a flowchart showing a method of driving a display device constructed according to an exemplary embodiment.

Referring to FIG. 20, first, the main processor 710 determines whether the display device is driven in a sound output mode. The sound output mode is a mode in which the display device 10 generates sound by executing an application such as music or video. Also, the sound output mode may include a call mode. The call mode is a mode in which a user performs voice communication or video communication through the display device 10 using a mobile communication module of the main circuit board 700 (S101 in FIG. 20).

Second, the main processor 710 controls to generate sound by vibrating the display panel 300 using the sound output unit SU of the sound generator 510 in the sound output mode (S102 of FIG. 20).

Specifically, the main processor 710 transmits sound data to the first sound driver 760 in the sound output mode. The first sound driver 760 generates a first driving voltage and a second driving voltage in accordance with the sound data. The first sound driver 760 generates the first driving voltage and the second driving voltage to the first electrode 511 and the second electrode 512 of the sound output unit SU of the sound generator 510 through the sound connector 740 and the sound circuit board 530.

Figure 21:
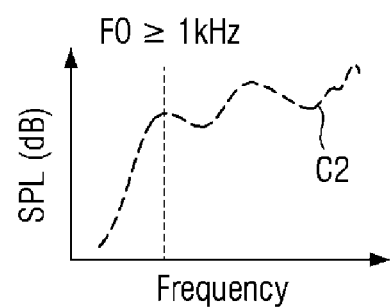
FIG. 21 is a graph showing the sound pressure level of a sound generator with respect to frequency in a sound output mode.

The sound generator 510 vibrates according to the first driving voltage and the second driving voltage, and the display panel 300 may vibrate up and down according to the vibration of the sound generator 510. Thus, as shown in FIG. 21, the display device 10 may generate a sound having F0 of 1 kHz. F0 indicates the minimum frequency at which the vibration displacement of the display panel 300 that is vibrated by the sound generator becomes larger than the reference displacement.

Third, the main processor 710 drives the display device 10 in a proximity sensing mode when the sound output mode is the call mode. The proximity sensing mode is a mode for sensing whether an object approaches the display device 10 at a short distance (S103 of FIG. 20).

Fourth, the main processor 710 controls the display panel 300 to generate ultrasonic waves by using the ultrasonic wave output unit UU of the sound generator 510 in the proximity sensing mode (S104 of FIG. 20).

The main processor 710 generates ultrasonic data to the second sound driver 770 in the proximity sensing mode. The second sound driver 770 generates a third driving voltage and a fourth driving voltage in accordance with the ultrasonic data. The second sound driver 770 transmits the third driving voltage and the fourth driving voltage to the third electrode 513 and the fourth electrode 514 of the ultrasonic wave output unit UU of the sound generator 510 through the sound connector 740 and the sound circuit board 530.

Figure 22:
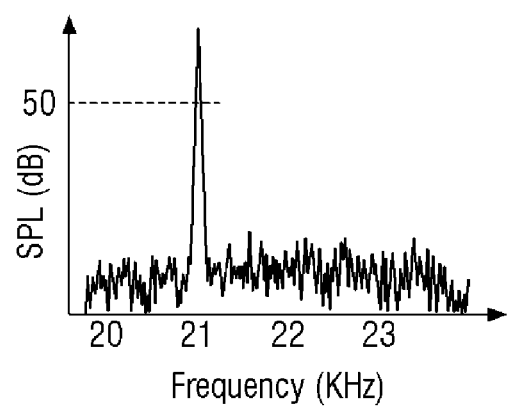
FIG. 22 is a graph showing the sound pressure level of a sound generator with respect to frequency in a proximity sensing mode.

The ultrasonic wave output unit UU of the sound generator 510 vibrates according to the third driving voltage and the fourth driving voltage, and the display panel 300 may vibrate up and down according to the vibration of the ultrasonic wave output unit UU of the sound generator 510. Thus, as shown in FIG. 22, the display device 10 may generate an ultrasonic wave having a sound pressure level of 50 dB or more at a frequency of 20 kHz or more.

As shown in FIG. 20, since the sound output mode and the proximity sensing mode are separately controlled, the display device 10 may operate in the sound output mode and simultaneously operate in the proximity sensing mode. That is, the display device 10 may generate a sound by allowing the sound output unit SU of the sound generator 510 to vibrate the display panel 300, and simultaneously generate an ultrasonic wave by allowing the ultrasonic wave output unit UU of the sound generator 510 to vibrate the display panel 300.

Fifth, the first microphone 780 and the second microphone 810 sense ultrasonic waves reflected by an object (S105 of FIG. 20).

The first microphone 780 and the second microphone 810 may sense sound waves and ultrasonic waves. For example, the first microphone 780 and the second microphone 810 may sense ultrasonic waves of 20 kHz to 50 kHz. The first microphone 780 converts the sensed ultrasonic wave into a first electrical signal and transmits the first electrical signal to the main processor 710, and the second microphone 810 converts the sensed ultrasonic wave into a second electrical signal and transmits the second electrical signal to the main processor 710.

In order to increase the accuracy of ultrasonic wave sensing reflected by the object, the first microphone 780 may be disposed on one side of the main circuit board 700, and the second microphone 810 may be disposed on the other side of the main circuit board 700. Thus, the first microphone 780 may be disposed at one side of the display device 10, and the second microphone 810 may be disposed at the other side of the display device 10.

Sixth, the main processor 710 determines whether the object is located close to the display device 10 on the basis of the first electrical signal input from the first microphone 780 and the second electrical signal input from the second microphone 810. The main processor 710 controls the display panel 300 not to display an image when the object is close to the display device 10. That is, the main processor 710 turns off the touch sensing unit 200 and the display panel 300 in response to detecting the object is located close to the display device 10. Thus, the display panel 300 may maintain the turn-off state even if the touch of a user is detected by the touch sensing unit 200 when the user's ears or another part of the body contacts the display device 10 in the call mode.

Hereinafter, a method in which the main processor 710 senses the proximity of an object in the proximity sensing mode will be described in detail with reference to FIGS. 23, 24, 25, and 26.

Figure 23:
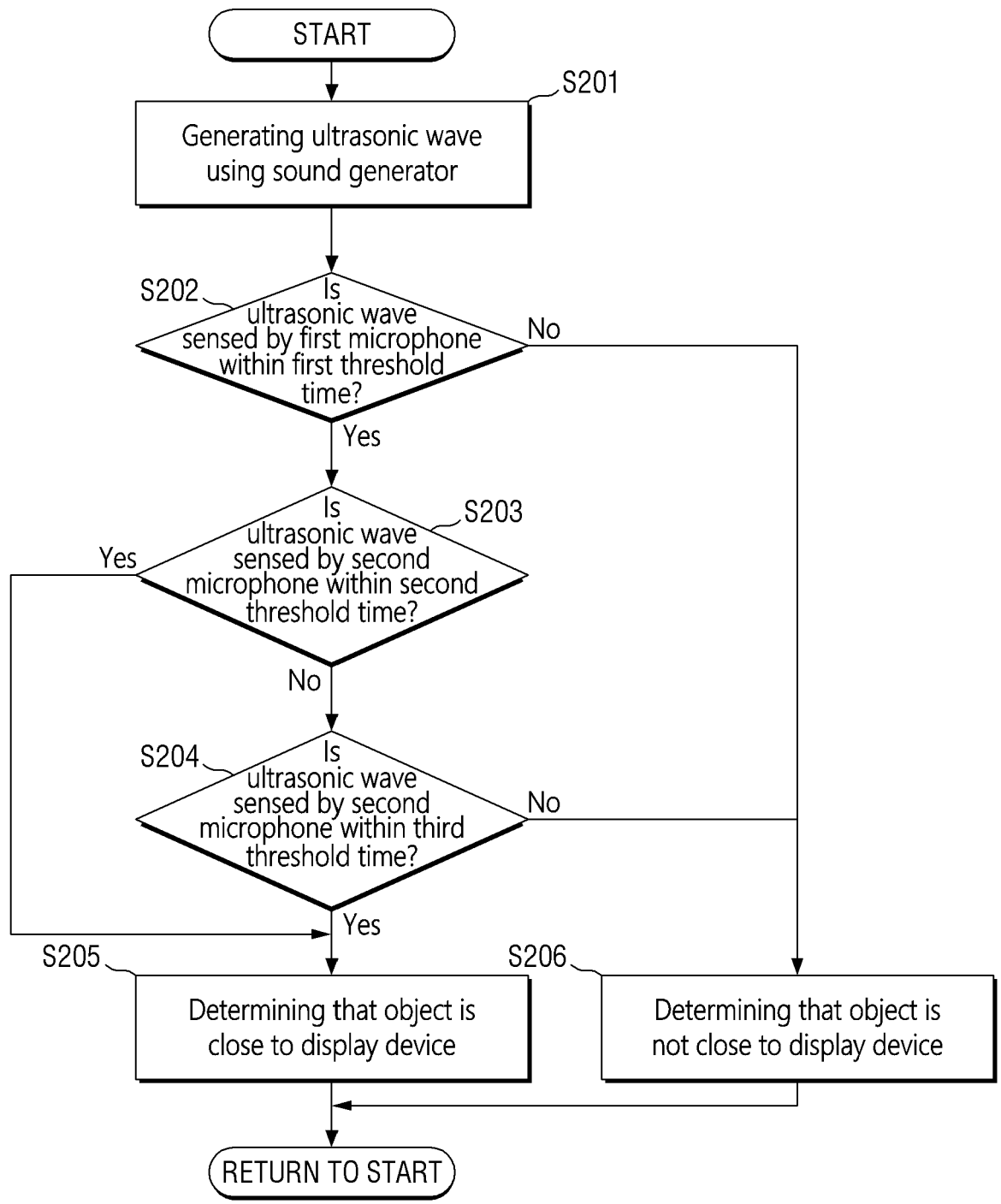
FIG. 23 is a flowchart showing a method of sensing a proximity in a proximity sensing mode.
Figure 24:
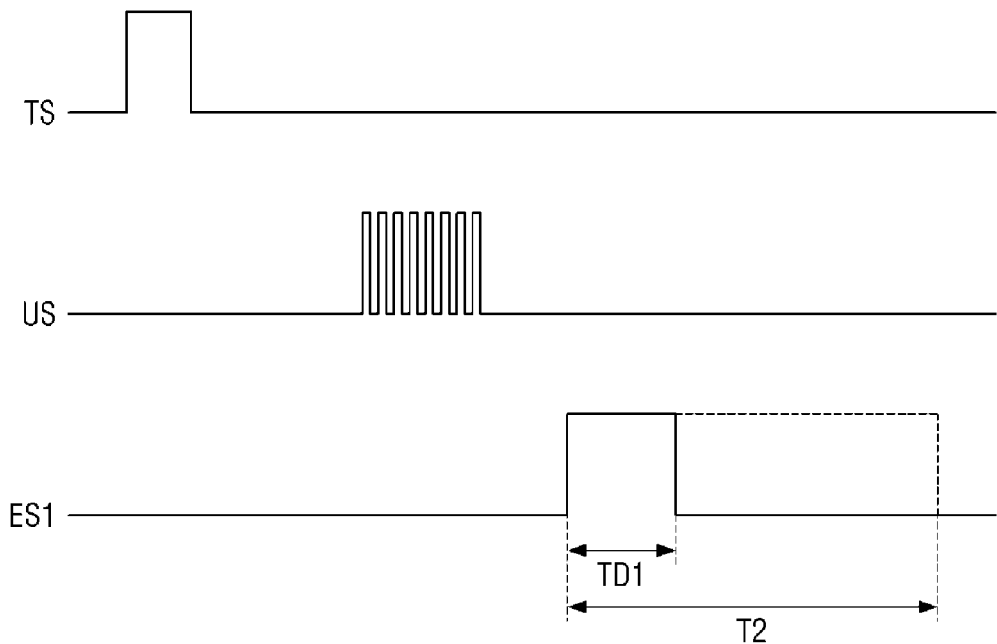
FIG. 24 is a waveform diagram showing the trigger signal of the main processor, the ultrasonic wave generated by the sound generator, and a first echo signal of the first microphone, according to an exemplary embodiment.
Figure 25:
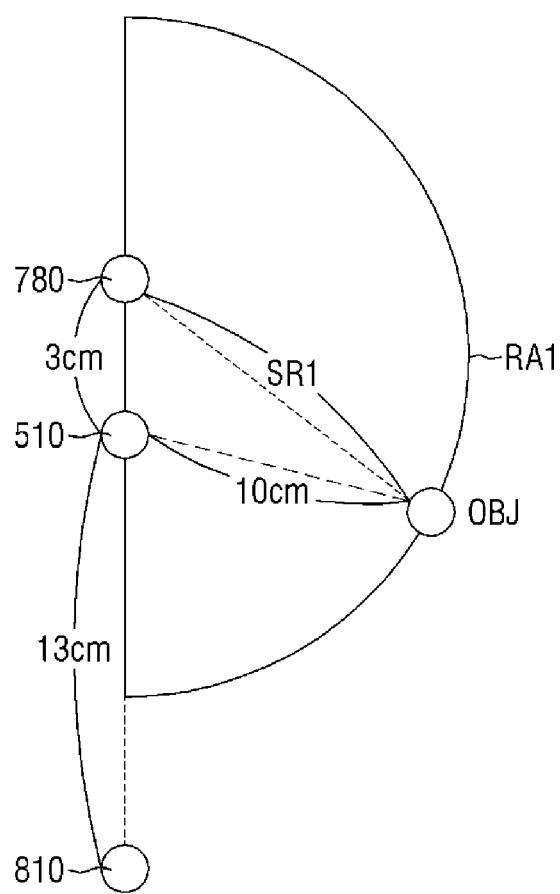
FIGS. 25 and 26 are exemplary views showing a sound generator, a first microphone, a second microphone, and an object for explaining the method of sensing a proximity in the proximity sensing mode, according to an exemplary embodiment.

FIG. 23 is a flowchart showing a method of sensing the proximity in a proximity sensing mode. FIG. 24 is a waveform diagram showing the trigger signal TS of the main processor, the ultrasonic wave US generated by the sound generator, and a first echo signal ES1 of the first microphone, according to an exemplary embodiment. FIGS. 25 and 26 are exemplary views showing a sound generator, a first microphone, a second microphone, and an object for explaining the method of sensing the proximity in the proximity sensing mode, according to an exemplary embodiment.

Referring to FIGS. 23, 24, and 25, first, the ultrasonic wave output unit UU of the sound generator 510 may vibrate the display panel 300 in the proximity sensing mode to generate an ultrasonic wave (S201 of FIG. 23).

Specifically, the main processor 710 generates ultrasonic data to the second sound driver 770 in the proximity sensing mode. The second sound driver 770 generates a third driving voltage and a fourth driving voltage according to the ultrasonic data. The second sound driver 770 generates a third driving voltage and a fourth driving voltage in accordance with the ultrasonic data. The second sound driver 770 transmits the third driving voltage and the fourth driving voltage to the third electrode 513 and the fourth electrode 514 of the ultrasonic wave output unit UU of the sound generator 510 through the sound connector 740 and the sound circuit board 530.

The ultrasonic wave output unit UU of the sound generator 510 vibrates according to the third driving voltage and the fourth driving voltage, and the display panel 300 may vibrate up and down according to the vibration of the ultrasonic wave output unit UU of the sound generator 510. Thus, as shown in FIG. 22, the display device 10 may generate an ultrasonic wave having a sound pressure level of 50 dB or more at a frequency of 20 kHz or more. As shown in FIG. 24, the ultrasonic wave output unit UU of the sound generator 510 may vibrate the display panel 300 to generate an ultrasonic wave US composed of n pulses (n is an integer of 2 or more).

Second, it is determined whether the ultrasonic wave generated from the ultrasonic output unit UU of the sound generator 510 is sensed by the first microphone 780 within a first threshold time TT1 (S202 of FIG. 23).

Specifically, the main processor 710 transmits ultrasonic data to the second sound driver 770, and transmits a trigger signal TS to the first microphone 780 and the second microphone 810 in the proximity sensing mode. The second microphone 810 convert a second echo signal to a first logic level voltage in response to the trigger signal TS after a first threshold time. The first microphone 780 convert a first echo signal ES1 to a first logic level voltage in response to the trigger signal TS after a first threshold time. The first threshold time may be defined as a period of time taken the ultrasonic wave output unit UU of the sound generator 510 to generate an ultrasonic wave.

The first microphone 780 converts the first echo signal ES1 to a second logic level voltage when the ultrasonic waves reflected by an object are sensed. The first microphone 780 converts the first echo signal ES1 to a second logic level voltage after a second threshold time when the ultrasonic waves reflected by the object are not sensed. The first microphone 780 transmits the first echo signal ES1 as a first electrical signal to the main processor 710. The main processor 710 sets a period in which the first echo signal ES1 has the first logic level voltage to a first ultrasonic wave sensing time (TD1), and determines whether the first ultrasonic wave sensing time TD1 is within a first threshold time TT1.

Meanwhile, the first threshold time TT1 may be defined as shown in FIG. 25. When the distance between the sound generator 510 and the first microphone 780 is 3 cm and the distance between the sound generator 510 and the object OBJ is 10 cm, the distance SR1 between the first microphone 780 and the object OBJ may be calculated by Equation 2.

$$SR1 = \sqrt{10^2 + 3^2} \approx 10.44 \qquad \text{[Equation 2]}$$

The distance SR1 between the first microphone 780 and the object OBJ may be approximately 10.44 cm. In this case, since the speed of the ultrasonic wave is 340 m/s, and the distance sensed by the first microphone 780 is 0.2044 m when the ultrasonic wave generated by the sound generator 510 is reflected by the object OBJ, the first threshold time TT1 may be calculated by Equation 3.

$$TT1 = \frac{0.2044}{340} \approx 0.601 \times 10^{-3} \qquad \text{[Equation 3]}$$

That is, the first threshold time TT1 may be 0.601 ms. In this case, as shown in FIG. 25, the sensing area RA1 of the object OBJ by the first microphone 780 in accordance with the first threshold time TT1 may be defined as an area where the sum of the distance (10 cm) between the objects OBJ adjacent to the sound generator 510 and the distance (SR1≈10.44 cm) between the first microphone 780 and the object OBJ is 20.44 cm.

Meanwhile, the first microphone 780 may be disposed at one side of the display device 10, and the second microphone 810 may be disposed at the other side of the display device 10 facing the one side. Thus, as shown in FIG. 25, the distance between the sound generator 510 and the first microphone 780 is different from and the distance between the sound generator 510 and the second microphone 810.

Therefore, as shown in FIG. 26 and S203 and S204, it is determined whether the object OBJ approximates to the display device 10 in consideration of the minimum distance SR2 and maximum distance SR3 between the sensed object OBJ and the second microphone 810.

Third, when the first ultrasonic wave sensing time is within the first threshold time TT1, it is determined whether the ultrasonic wave generated from the ultrasonic wave output unit UU of the sound generator 510 is sensed by the second microphone 810 within the second threshold time (S203 of FIG. 23).

Specifically, the second microphone 810 converts the second echo signal to a second logic level voltage when the ultrasonic waves reflected by the object are sensed. The second microphone 810 converts the second echo signal to the second logic level voltage after a second threshold time when the ultrasonic waves reflected by the object are not sensed. The second microphone 810 transmits the second echo signal as a second electrical signal to the main processor 710. The main processor 710 sets a period in which the second echo signal has the first logic level voltage to a second ultrasonic wave sensing time, and determines whether the second ultrasonic wave sensing time TD1 is within a second threshold time.

Meanwhile, the second threshold time may be defined as shown in FIG. 26. When the distance between the sound generator 510 and the second microphone 810 is 13 cm, the distance between the sound generator 510 and the object OBJ is 10 cm, and the minimum distance between the second microphone 810 and the object OBJ is defined by SR2, the contact point of the vertical line formed by the object OBJ and the straight line connecting the sound generator 510 and the second microphone 810 may be represented by A. In FIG. 26, the distance between the sound generator 510 and A is defined as 1.5 cm. In this case, the distance (a) between the contact point and the object OBJ may be calculated by Equation 4.

$$a = \sqrt{10^2 - 1.5^2} \approx 9.887 \qquad \text{[Equation 4]}$$

In this case, the minimum distance SR2 between the second microphone 810 and the object OBJ may be calculated by Equation 5.

$$SR2 = \sqrt{11.5^2 + 9.887^2} \approx 15.166 \qquad \text{[Equation 5]}$$

The minimum distance SR2 between the first microphone 780 and the object OBJ may be approximately 15.166 cm. In this case, since the speed of the ultrasonic wave is 340 m/s, and the distance sensed by the first microphone 780 is 0.25166 m when the ultrasonic wave generated by the sound generator 510 is reflected by the object OBJ, the second threshold time TT2 may be calculated by Equation 6.

$$TT2 = \frac{0.25166}{340} \approx 0.74 \times 10^{-3} \quad \text{[Equation 6]}$$

That is, the second threshold time TT2 may be 0.74 ms.

Fourth, when the second ultrasonic wave sensing time is within the second threshold time TT2, it is determined whether the ultrasonic wave generated from the ultrasonic wave output unit UU of the sound generator 510 is sensed by the second microphone 810 within a third threshold time TT3 (S204 of FIG. 23).

Specifically, the third threshold time TT3 may be defined as shown in FIG. 26. When the distance between the sound generator 510 and the second microphone 810 is 13 cm, the distance between the sound generator 510 and the object OBJ is 10 cm, and the maximum distance SR2 between the second microphone 810 and the object OBJ is defined by SR2, the contact point of the vertical line formed by the object OBJ and the straight line connecting the sound generator 510 and the second microphone 810 may be represented by B. In FIG. 26, the distance between the sound generator 510 and B is defined as 4.5 cm. In this case, the distance (b) between the contact point and the object OBJ may be calculated by Equation 7.

$$b=\sqrt{10^2-4.5^2} \approx 8.93 \quad \text{[Equation 7]}$$

In this case, the maximum distance SR3 between the second microphone 810 and the object OBJ may be calculated by Equation 8.

$$SR3=\sqrt{17.5^2+8.93^2} \approx 19.65 \quad \text{[Equation 8]}$$

The maximum distance SR2 between the second microphone 810 and the object OBJ may be approximately 19.65 cm. In this case, since the speed of the ultrasonic wave is 340 m/s, and the distance sensed by the first microphone 780 is 0.2965 m when the ultrasonic wave generated by the sound generator 510 is reflected by the object OBJ, the third threshold time TT3 may be calculated by Equation 9.

$$TT3 = \frac{0.2965}{340} \approx 0.872 \times 10^{-3} \quad \text{[Equation 9]}$$

That is, the third threshold time TT3 may be 0.872 ms.

The final sensing area DA considering the sensing area DA1 by the first microphone 780 and the sensing area of the object OBJ by the second microphone 810 according to the second threshold time TT2 and the third threshold time TT3 may be defined by the minimum distance SR2 and maximum distance SR3 between the second microphone 810 and the object OBJ in the sensing area DA1 by the first microphone 780.

Fifth, when the first ultrasonic wave sensing time is within the first threshold time TT1, the main processor 710 determines that there is an object close to the display device 10 if the second ultrasonic wave sensing time is within the third threshold time TT3 even though the second ultrasonic wave sensing time is longer than the second threshold time TT2 (S205 of FIG. 23).

For example, the main processor 710 may be set to turn off the display panel 300 when it is determined that the object is close to the display device 10. Thus, the display panel 300 may maintain the turn-off state even if the touch of a user is detected by the touch sensing unit 200 when the user's ears or another part of the body contacts the display device 10 in the call mode.

Sixth, when the first ultrasonic wave sensing time is longer than the first threshold time TT1, the main processor 710 determines that there is no object close to the display device 10 if the second ultrasonic wave sensing time is longer than the second threshold time TT2 and is longer than the third threshold time TT3 even though the first ultrasonic wave sensing time is within the first threshold time TT1 (S206 of FIG. 23).

As described above, in the sound generator, the display device including the sound generator, and the method of driving the display device according to an exemplary embodiment, a sound can be provided by vibrating the display panel using the sound output unit of the sound generator disposed under the display panel, the sound generator can be utilized as a front speaker. Therefore, the front speaker disposed on the front surface of the display device can be omitted, thereby widening the area where an image is displayed on the front surface of the display device and reducing a cost.

Further, in the sound generator, the display device including the sound generator, and the method of driving the display device according to an exemplary embodiment, the display panel is vibrated by the ultrasonic wave output unit of the sound generator to generate ultrasonic waves, and the ultrasonic waves reflected by an object can be sensed by the first microphone and the second microphone. Thus, the sound generator may be used as an ultrasonic wave emitter of an ultrasonic proximity sensor, and the first microphone and the second microphone may be used as an ultrasonic wave detector of an ultrasonic proximity sensor. Accordingly, since the ultrasonic wave emitter of the ultrasonic proximity sensor and the ultrasonic wave detector may be omitted, it is possible not only to widen the area where an image is displayed on the front surface of the display device, but also to reduce a cost.

Further, in the sound generator, the display device including the sound generator, and the method of driving the display device according to an exemplary embodiment, the sound circuit board connected to the sound generator may be connected to the sound connector of the main circuit board through the first through-hole of the middle frame. Therefore, the sound generator can be stably connected to the first sound driver and the second sound driver of the main circuit board.

Further, in the sound generator, the display device including the sound generator, and the method of driving the display device according to an exemplary embodiment, the volume of a sound of the sound output unit is proportional to the area of the sound output unit, considering the volume of the sound of the sound output unit, the area of the first sub-vibration layer may be larger than the area of the second sub-vibration layer.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device, comprising:
   a display panel; and
   a sound generator, the sound generator comprising:
      a sound output unit including a first sub-vibration layer, and configured to vibrate the display panel to generate an audible sound; and
      an ultrasonic wave output unit including a second sub-vibration layer, and configured to vibrate the display panel to generate an ultrasonic wave,
   wherein:
   the sound output unit overlaps the ultrasonic wave output unit in a thickness direction of the display panel; and
   the first sub-vibration layer is in contact with the second sub-vibration layer.

2. The display device of claim 1, wherein a height of the sound output unit is greater than a height of the ultrasonic wave output unit.

3. The display device of claim 1, wherein an area of the sound output unit in a plan view is same as an area of the ultrasonic wave output unit in a plan view.

4. The display device of claim 1, wherein:
   the sound output unit comprises:
      first branch electrodes to which a first driving voltage is applied; and
      second branch electrodes to which a second driving voltage is applied;
   the first sub-vibration layer is disposed between each of the first electrodes and each of the second electrodes; and
   the first sub-vibration layer is configured to contract and expand based on the first driving voltage applied to the first branch electrodes and the second driving voltage applied to the second branch electrodes.

5. The display device of claim 4, wherein:
   the ultrasonic wave output unit comprises:
      third branch electrodes to which a third driving voltage is applied; and
      fourth branch electrodes to which a fourth driving voltage is applied;
   the second sub-vibration layer is disposed between each of the third branch electrodes and each of the fourth branch electrodes; and
   the second sub-vibration layer is configured to contract and expand based on the third driving voltage applied to the third branch electrodes and the fourth driving voltage applied to the fourth branch electrodes.

6. The display device of claim 5, further comprising:
   a third stem electrode connected to the third branch electrodes; and
   a fourth stem electrode connected to the fourth branch electrodes.

7. The display device of claim 6, wherein:
   the third stem electrode is disposed on at least one side surface of the second sub-vibration layer; and
   the fourth stem electrode is disposed on at least one side surface of the second sub-vibration layer.

8. The display device of claim 6, wherein:
   the third stem electrode is disposed in a third contact hole formed by removing a portion of the second sub-vibration layer; and
   the fourth stem electrode is disposed in a fourth contact hole formed by removing another portion of the second sub-vibration layer.

9. The display device of claim 4, wherein:
   the number of the first branch electrodes is greater than the number of the third branch electrodes; and
   the number of the second branch electrodes is greater than the number of the fourth branch electrodes.

10. The display device of claim 4, further comprising:
    a first stem electrode connected to the first branch electrodes; and
    a second stem electrode connected to the second branch electrodes.

11. The display device of claim 10, wherein:
    the first stem electrode is disposed on at least one side surface of the first sub-vibration layer; and
    the second stem electrode is disposed on at least one side surface of the first sub-vibration layer.

12. The display device of claim 10, wherein:
    the first stem electrode is disposed in a first contact hole formed by removing a portion of the first sub-vibration layer; and
    the second stem electrode is disposed in a second contact hole formed by removing another portion of the first sub-vibration layer.

13. A display device, comprising:
    a display panel; and
    a sound generator, the sound generator comprising:
       a sound output unit including a first sub-vibration layer, and configured to vibrate the display panel to generate an audible sound; and
       an ultrasonic wave output unit including a second sub-vibration layer configured to vibrate the display panel to generate an ultrasonic wave,
    wherein:
    the ultrasonic wave output unit is disposed on a side of the sound output unit; and
    the first sub-vibration layer is in contact with the second sub-vibration layer.

14. The display device of claim 13, wherein a height of the sound output unit is the same as a height of the ultrasonic wave output unit.

15. The display device of claim 13, wherein an area of the sound output unit in a plan view is larger than an area of the ultrasonic wave output unit in a plan view.

16. The display device of claim 13, wherein:
    the sound output unit comprises:
       first branch electrodes to which a first driving voltage is applied; and
       second branch electrodes to which a second driving voltage is applied;
    the first sub-vibration layer is disposed between each of the first electrodes and each of the second electrodes; and
    the first sub-vibration layer is configured to contract and expand based on the first driving voltage applied to the first branch electrodes and the second driving voltage applied to the second branch electrodes.

17. The display device of claim 16, wherein:
    the ultrasonic wave output unit comprises:
       third branch electrodes to which a third driving voltage is applied; and
       fourth branch electrodes to which a fourth driving voltage is applied;
    the second sub-vibration layer is disposed between each of the third branch electrodes and each of the fourth branch electrodes; and
    the second sub-vibration layer is configured to contract and expand based on the third driving voltage applied to the third branch electrodes and the fourth driving voltage applied to the fourth branch electrodes.

18. The display device of claim 17, wherein:
the number of the first branch electrodes is greater than the number of the third branch electrodes; and
the number of the second branch electrodes is greater than the number of the fourth branch electrodes.

19. The display device of claim 16, further comprising:
a first stem electrode connected to the first branch electrodes; and
a second stem electrode connected to the second branch electrodes,
wherein:
the first stem electrode is disposed on at least one side surface of the first sub-vibration layer; and
the second stem electrode is disposed on at least one side surface of the first sub-vibration layer.

20. The display device of claim 16, further comprising:
a first stem electrode connected to the first branch electrodes; and
a second stem electrode connected to the second branch electrodes,
wherein:
the first stem electrode is disposed in a first contact hole formed by removing a portion of the first sub-vibration layer; and
the second stem electrode is disposed in a second contact hole formed by removing another portion of the first sub-vibration layer.

* * * * *